United States Patent
Kaijima

[19]

[11] Patent Number: 6,047,299
[45] Date of Patent: Apr. 4, 2000

[54] DOCUMENT COMPOSITION SUPPORTING METHOD AND SYSTEM, AND ELECTRONIC DICTIONARY FOR TERMINOLOGY

[75] Inventor: Ryota Kaijima, Tokyo, Japan

[73] Assignee: Hitachi Business International, Ltd., Tokyo, Japan

[21] Appl. No.: 08/827,085

[22] Filed: Mar. 26, 1997

[30] Foreign Application Priority Data

Mar. 27, 1996 [JP] Japan .................................. 8-071595

[51] Int. Cl.[7] .................................................. G06F 17/30
[52] U.S. Cl. ......................... 707/532; 707/500; 707/533; 704/10
[58] Field of Search .................................. 707/536, 532, 707/530, 102, 500, 8, 10; 704/8, 10, 2

[56] References Cited

U.S. PATENT DOCUMENTS

| | | | |
|---|---|---|---|
| 4,774,666 | 9/1988 | Miyao et al. | 704/2 |
| 5,132,901 | 7/1992 | Yokogawa | 704/10 |
| 5,214,583 | 5/1993 | Miike et al. | 704/4 |
| 5,424,947 | 6/1995 | Nagao et al. | 704/9 |
| 5,510,981 | 4/1996 | Berger et al. | 704/2 |
| 5,535,120 | 7/1996 | Chong et al. | 704/3 |
| 5,649,221 | 7/1997 | Crawford et al. | 707/532 |
| 5,742,834 | 4/1998 | Kobayashi | 704/10 |
| 5,787,386 | 7/1998 | Kaplan et al. | 704/8 |
| 5,812,863 | 9/1998 | Ishikawa | 707/533 |
| 5,826,220 | 10/1998 | Takeda et al. | 704/7 |

FOREIGN PATENT DOCUMENTS

| | | |
|---|---|---|
| 1 270 063 | 6/1990 | Canada . |
| 57-59268 | 4/1982 | Japan . |
| 63-76055 | 4/1988 | Japan . |
| 63-184864 | 7/1988 | Japan . |
| 1-214963 | 8/1989 | Japan . |

(List continued on next page.)

OTHER PUBLICATIONS

HT[3]–J (product name; Hitachi Terminology Transformation Tool—Japanese).
Development of HT[3] program for technical term transformation and standardization, Technical Communication Association, Aug. 1996.
Kenkyusha's New English–Japanese Dictionary, Yoshio Koine, Fifth Edition, Tokyo, Japan, p. 347.
VZ Editor Version 1.5, 1989, C. Mos, Published by Village Center, pp. 427–428.

*Primary Examiner*—Paul R. Lintz
*Assistant Examiner*—Greta L. Robinson
*Attorney, Agent, or Firm*—Kenyon & Kenyon

[57] ABSTRACT

A document composition supporting method and system for the support of document editing or translation use a database electronic terminology dictionary which is composed such that terms in standard expression and terms in alternative spelling/expression corresponding thereto are registered in association with each other. The terminology dictionary is stored in a CD-ROM, floppy disk or the like and the contents of the terminology dictionary are loaded into a hard disk of a computer system such as personal computer. The terminology dictionary is used to search an inputted document for terms in the document matching with terms in standard expression and terms in alternative spelling/expression registered in the terminology dictionary, and the result of search is displayed on a display unit. For terminological standardization of the document, the terms in the document matching with the terms in alternative spelling/expression inputted in the terminology dictionary are replaced by the corresponding terms in standard expression. For translation of the document with terminological standardization thereof, terms of a source language in standard expression and in alternative spelling/expression are applied with target equivalent of a target language corresponding thereto. The process and result of such terminological standardization or translation can be recorded.

27 Claims, 15 Drawing Sheets

FOREIGN PATENT DOCUMENTS

| | | |
|---|---|---|
| 1-270166 | 10/1989 | Japan . |
| 3-116266 | 5/1991 | Japan . |
| 3-148752 | 6/1991 | Japan . |
| 4-115325 | 4/1992 | Japan . |
| 6-149878 | 5/1994 | Japan . |
| 6-195380 | 7/1994 | Japan . |
| 7-21186 | 1/1995 | Japan . |
| 7-36903 | 2/1995 | Japan . |
| 7-36912 | 2/1995 | Japan . |
| 7-85040 | 3/1995 | Japan . |
| 7-141362 | 6/1995 | Japan . |
| 7-262195 | 10/1995 | Japan . |
| 7-325826 | 12/1995 | Japan . |
| 8-44748 | 2/1996 | Japan . |

FIG.3A

| READING OF TERM | JAPANESE STANDARD EXPRESSION | JAPANESE PART OF SPEECH | JAPANESE ALTERNATIVE SPELING/EXPRESSION (SAME PART-OF-SPEECH CODE AS PRECEDING COLUMN CAN BE OMITTED) | ENGLISH STANDARD EXPRESSION | | | | |
|---|---|---|---|---|---|---|---|---|
| | | | | STANDARD EXPRESSION 1 | ENGLISH PART 1 OF SPEECH | STANDARD EXPRESSION 2 | ENGLISH PART 2 OF SPEECH |
| あいてCPU | 相手CPU | 10 | 相手のCPU¥リモートCPU¥¥ | remote CPU | 1 | | |
| かくのう | 格納 | 12 | ストア¥ストアー¥保存¥セーブ¥¥ | store | 3 | storage | 1 |
| かんしじかん | 監視時間 | 10 | モニタリングタイム¥モニタリングタイム¥モニタリング時間¥モニタリング時間¥モニター時間及びモニター時間¥¥ | monitoring time | 1 | | |
| けいこくしぐなる | 警告シグナル | 10 | 警告信号¥ワーニングシグナル¥ワーニングシグナル¥ワーフォーニングシグナル¥¥ | warning signal | 1 | | |
| さーば | サーバ | 10 | サーバー¥¥ | server | 1 | | |
| さいきどう | 再起動 | 12 | 再スタート¥再度スタート¥リスタート¥再開¥再立上げ¥再び立上げ¥¥ | restart | 3 | | |
| CPUばんごう | CPU番号 | 10 | CPUナンバー¥CPUナンバン¥¥ | CPU number | 1 | | |
| じCPU | 自CPU | 10 | 自分のCPU¥ローカルCPU¥¥ | local CPU | 1 | | |
| ていぎ | 定義 | 12 | デファイン¥[28]¥デフィニション¥デフィニッションファイ¥[10]¥デフィニッション¥[10]¥デフィニッション¥[10]¥ | define | 4 | definition | 1 |
| ていぎふぁいる | 定義ファイル | 10 | デフィニッションファイル¥デフィニッションファイ¥デフィニッションファイル¥デフィニッションファイル¥¥ | definition file | 1 | | |
| とうちゃく | 到着 | 12 | 着信¥¥ | arrival | 1 | arrive | 4 |
| ぷろせす | プロセス | 10 | 処理[12]¥¥ | process | 3 | | |
| まちじょうたい | 待ち状態 | 10 | ウェイト状態¥ウェイトステータス¥ウェイトステータス¥ウェイトステータス¥¥ | wait status | 1 | | |
| めっせーじ | メッセージ | 10 | 通信文¥¥ | message | 1 | | |
| めっせーじじゅしんようきゅう | メッセージ受信要求 | 12 | メッセージの受信依頼¥メッセージの受信依頼¥メッセージ受信依頼[28]¥メッセージ受信依頼[28]¥メッセージを受信依頼[28]¥¥ | message receive request | 1 | | |
| めっせーじそうしんようきゅう | メッセージ送信要求 | 12 | メッセージの送信依頼¥メッセージの送信依頼¥メッセージ送信依頼[28]¥メッセージ送信依頼[28]¥メッセージを送信依頼[28]¥¥ | message transmission request | 1 | | |
| りたーんち | リターン値 | 10 | リターン値¥リターンバリュー¥リターンバリュー¥¥ | return value | 1 | | |

FIG. 3B

| ENGLISH ALTERNATIVE SPELLING/ EXPRESSION (SAME PART-OF-SPEECH CODE AS PRECEDING COLUMN CAN BE OMITTED) | EXPLANATION | JAPANESE READING FOR SORTING | ENGLISH SPELLING FOR SORTING | INPUT DATE | FIELD SOURCE | INPUT NAME |
|---|---|---|---|---|---|---|
| | | あいてしいひいゆう | remotecpu// | 30-Jun | 41/Y-1-0005 | RK |
| | | かくのう | store// | 30-Jun | na | RK |
| | | かんしじかん | monitoringtime// | 30-Jun | 71/Y-1-0005 | RK |
| | | けいこくしくなる | warningsignal// | 30-Jun | 84/Y-1-0005 | RK |
| | | さーば | server// | 30-Jun | 95/Y-1-0005 | RK |
| resume[4]¥resuming[1]¥¥ | | さいきとう | restart// | 30-Jun | 96/Y-1-0005 | RK |
| | | しいひいひいゆうはんこう | cpunumber// | 30-Jun | 6/Y-1-0005 | RK |
| | | しいしいひいゆう | localcpu// | 30-Jun | 99/Y-1-0005 | RK |
| | | ていき | define// | 30-Jun | na | RK |
| | 到着も着信も同義語。arrive at...。reachは arrive/arrivalの異表記。 | ていきふぁいる | definitionfile// | 30-Jun | 150/Y-1-0005 | RK |
| reach[3]¥¥ | | とうちゃく | arrival// | 30-Jun | na | RK |
| | | ふろせす | process// | 30-Jun | 207/Y-1-0005 | RK |
| queued[5]¥¥ | | まちしようたい | waitstatus// | 30-Jun | 222/Y-1-0005 | RK |
| | | めつせーじ | message// | 3-Oct | 225/Y-1-0005 | RK |
| | | めつせーじしゆしん | messagereceive request// | 23-Jan | 226/Y-1-0005 | RK |
| message sending request ¥¥ | | めつせーじそうしん ようきゆう | messagetransmission request// | 30-Jun | 227/Y-1-0005 | RK |
| value returned¥returned value¥¥ | | りたーんち | returnvalue// | 30-Jun | 240/Y-1-0005 | RK |

FIG.4A

ORIGINAL JAPANESE TEXT

自分のCPUのサーバが相手の CPU にメッセージ受信依頼を出すと、メッセージが到着していない場合にはウエイト状態になりますが、別のプロセスがサーバにメッセージ送信依頼を出すと処理がリスタートされます。
リモートCPUにメッセージが着信していた場合には、msgp にセーブされ、制御はサーバに戻ります。
メッセージの送信元CPU番号は、メッセージ受信要求のリターン値で得ることができます。制御がサーバに戻るときを起点として、再度メッセージ受信依頼が発行されるまでの時間を監視できます。
モニタ時間はサーバ定義ファイルにサーバーごとに定義してください。
監視時間以上経過した場合は、サーバに対して警告シグナルが送信されます。

FIG.4B

AFTER JAPANESE TERMINOLOGY CHECK
(COLORING/UNDERLINING)

自分のCPUのサーバが相手の CPU にメッセージ受信依頼を出すと、メッセージが到着していない場合にはウエイト状態になりますが、別のプロセスがサーバにメッセージ送信依頼を出すと処理がリスタートされます。
リモートCPUにメッセージが着信していた場合には、msgp にセーブされ、制御はサーバに戻ります。
メッセージの送信元CPU番号は、メッセージ受信要求のリターン値で得ることができます。制御がサーバに戻るときを起点として、再度メッセージ受信依頼が発行されるまでの時間を監視できます。
モニタ時間はサーバ定義ファイルにサーバーごとに定義してください。
監視時間以上経過した場合は、サーバに対して警告シグナルが送信されます。

FIG.4C

AFTER REPLACEMENT

自CPUのサーバが相手のCPUにメッセージ受信要求を出すと、メッセージが到着していない場合には待ち状態になりますが、別のプロセスがサーバにメッセージ送信要求を出すと処理が再起動されます。
相手CPUにメッセージが到着していた場合には、msgpに格納され、制御はサーバに戻ります。
メッセージの送信元CPU番号は、メッセージ受信要求のリターン値で得ることができます。制御がサーバに戻るときを起点として、再度メッセージ受信要求が発行されるまでの時間を監視できます。
監視時間はサーバ定義ファイルにサーバごとに定義してください。
監視時間以上経過した場合は、サーバに対して警告シグナルが送信されます。

FIG.4D

COMPLETED

自CPUのサーバが相手のCPUにメッセージ受信要求を出すと、メッセージが到着していない場合には待ち状態になりますが、別のプロセスがサーバにメッセージ送信要求を出すとプロセスが再起動されます。
相手CPUにメッセージが到着していた場合には、msgpに格納され、制御はサーバに戻ります。
メッセージの送信元CPU番号は、メッセージ受信要求のリターン値で得ることができます。制御がサーバに戻るときを起点として、再度メッセージ受信要求が発行されるまでの時間を監視できます。
監視時間はサーバ定義ファイルにサーバごとに定義してください。
監視時間以上経過した場合は、サーバに対して警告シグナルが送信されます。

FIG.5A

ORIGINAL ENGLISH TEXT

When the server in the local CPU issues a message receive request to the remote CPU, the server enters wait status, if no message reaches at the remote CPU. In this case, the server restarts processing when another task issues a message sending request to the server. When a message already arrived at the remote CPU, the message is stored in the area addressed by msgp and control is returned to the server. The message-sending CPU number can be obtained from the value returned by the message receive request. Wgen control is returned to the server, monitoring of the time until a next message receive request is issued can be started. Define the monitoring time for each server in the server definition file. When the monitoring time is exceeded, the warning signal is sent to the server.

FIG.5B

AFTER TERMINOLOGY CHECK
(COLORING/UNDERLINING)

When the <u>server</u> in the <u>local CPU</u> issues a <u>message receive request</u> to the <u>remote CPU</u>, the <u>server</u> enters <u>wait status</u>, if no <u>message reaches</u> at the <u>remote CPU</u>. In this case, the <u>server restarts processing</u> when another task issues a <u>message sending request</u> to the <u>server</u>. When a <u>message</u> already <u>arrived</u> at the <u>remote CPU</u>, the <u>message</u> is <u>stored</u> in the area addressed by msgp and control is returned to the <u>server</u>. The message-sending <u>CPU number</u> can be obtained from the <u>value returned</u> by the <u>message receive request</u>. Wgen control is returned to the <u>server</u>, monitoring of the time until a next <u>message receive request</u> is issued can be started. <u>Define</u> the <u>monitoring time</u> for each <u>server</u> in the <u>server definition file</u>. When the <u>monitoring time</u> is exceeded, the <u>warning signal</u> is sent to the <u>server</u>.

FIG. 5C

AFTER REPLACEMENT

When the server in the local CPU issues a message receive request to the remote CPU, the server enters wait status, if no message arrives at the remote CPU. In this case, the server restarts processing when another task issues a message transmission request to the server. When a message already arrived at the remote CPU, the message is stored in the area addressed by msgp and control is returned to the server. The message-sending CPU number can be obtained from the value returned by the message receive request. Wgen control is returned to the server, monitoring of the time untila next message receive request is issued can be started. Define the monitoring time for each server in the server definition file. When the monitoring time is exceeded, the warning signal is sent to the server.

FIG. 5D

COMPLETED

When the server in the local CPU issues a message receive request to the remote CPU, the server enters wait status, if no message arrives at the remote CPU. In this case, the server restarts processing when another task issues a message transmission request to the server. When a message already arrived at the remote CPU, the message is stored in the area addressed by msgp and control is returned to the server. The message-sending CPU number can be obtained from the value returned by the message receive request. Wgen control is returned to the server, monitoring of the time untila next message receive request is issued can be started. Define the monitoring time for each server in the server definition file. When the monitoring time is exceeded, the warning signal is sent to the server.

FIG. 6A

ORIGINAL JAPANESE TEXT

自分のCPUのサーバが相手のCPUにメッセージ受信依頼を出すと、メッセージが到着していない場合にはウエイト状態になりますが、別のプロセスがサーバにメッセージ送信依頼を出すと処理がリスタートされます。
リモートCPUにメッセージが着信していた場合には、msgpにセーブされ、制御はサーバに戻ります。
メッセージの送信元CPU番号は、メッセージ受信要求のリターン値で得ることができます。制御がサーバに戻るときを起点として、再度メッセージ受信依頼が発行されるまでの時間を監視できます。
モニタ時間はサーバ定義ファイルにサーバーごとに定義してください。
監視時間以上経過した場合は、サーバに対して警告シグナルが送信されます。

FIG. 6B

TEXT APPLIED WITH ENGLISH STANDARD EXPRESSION

自分のCPU のサーバ が相手のCPU にメッセージ受信依頼 を出すと、メッセージ が到着し ていない場合にはウエイト状態 になりますが、別のプロセス がサーバ にメッセージ送信依頼 を出すと処理 がリスタートさ れます。
[loca] CPU] [server] [remote CPU] [message receive request] [message] [arrive] [wait status] [process] [server] [message transmission request] [process] [restart]
リモートCPU にメッセージ が着信 していた場合には、msgp にセーブされれ、制御はサーバ に戻ります。
[remote CPU] [message] [arriva] [store] [server]
メッセージ の送信元CPU番号 は、メッセージ受信要求 のリターン値 で得ることができます。制御がサーバ に戻るときを起点 として、再度メッセージ受信依頼 が発行 されるまでの時間を監視できます。
[message] [CPU number] [message receive request] [return value] [server]

FIG.6C

AFTER TRANSLATION

When the <u>server</u> in the <u>local CPU</u> issues a <u>message receive request</u> to the <u>remote CPU</u>, the <u>server</u> enters <u>wait status</u>, if no <u>message arrives</u> at the <u>remote CPU</u>. In this case, the <u>server</u> <u>restarts</u> <u>processing</u> when another task issues a <u>message transmission request</u> to the <u>server</u>. When a <u>message</u> already <u>arrived</u> at the <u>remote CPU</u>, the <u>message</u> is <u>stored</u> in the area addressed by msgp and control is returned to the <u>server</u>. The <u>message</u>-sending <u>CPU number</u> can be obtained from the <u>return value</u> by the <u>message receive request</u>.

FIG.6D

COMPLETED

When the server in the local CPU issues a message receive request to the remote CPU, the server enters wait status, if no message arrives at the remote CPU. In this case, the server restarts processing when another task issues a message transmission request to the server. When a message already arrived at the remote CPU, the message is stored in the area addressed by msgp and control is returned to the server. The message-sending CPU number can be obtained from the return value by the message receive request.

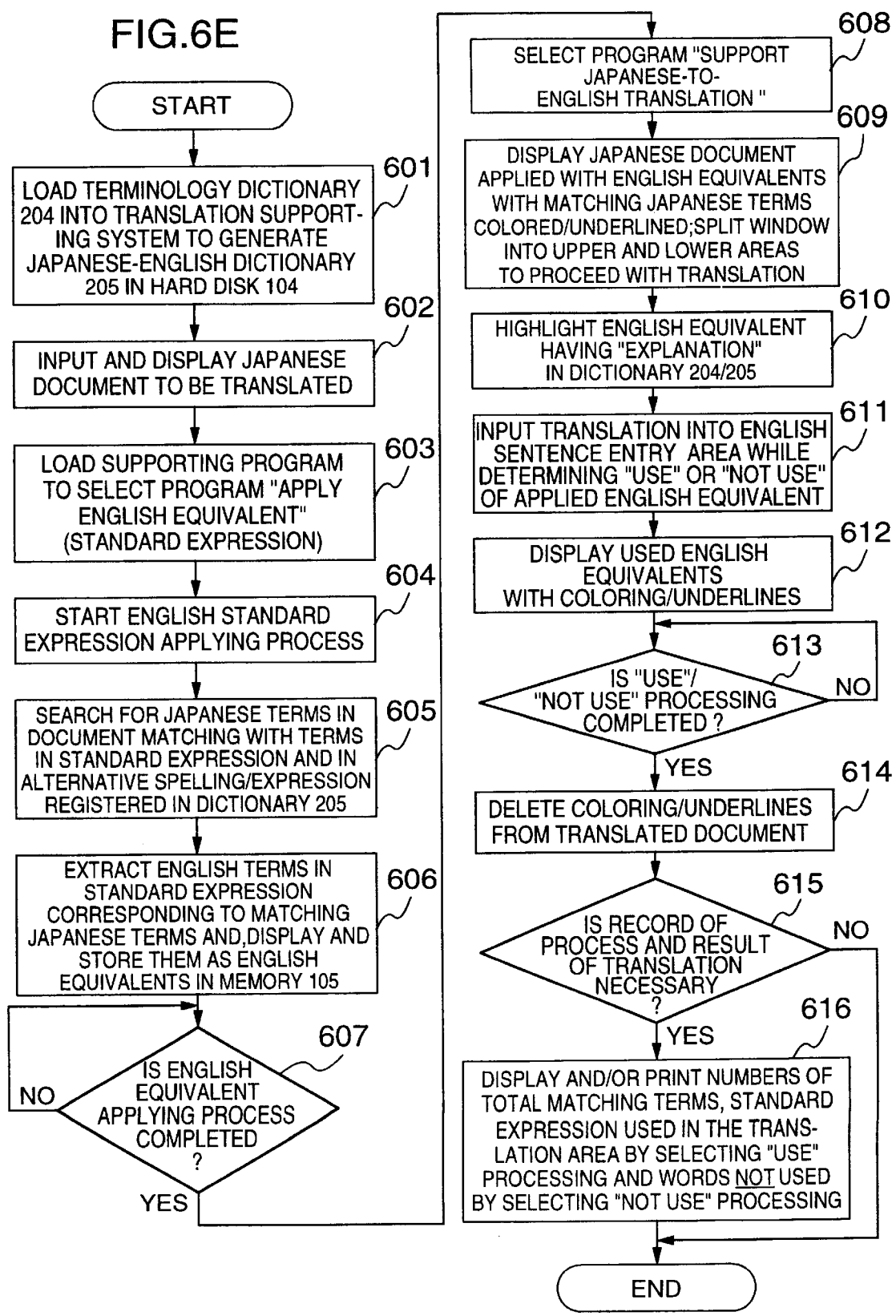

FIG.7A

自分のCPU のサーバ が相手のCPU にメッセージ受信依頼 を出すと、メッセージ が到着し ていない場合にはウエイト状態 になりますが、別のプロセス がサーバ にメッセージ送信依頼 を出すと処理 がリスタートさ れます。
リモートCPU にメッセージ が着信し ていた場合には、msgpにセーブされ、制御はサーバ に戻ります。
メッセージ の送信元CPU番号 は、メッセージ受信要求 のリターン値 で得ることができます。制御がサーバ に戻るときを起点 として、再度メッセージ受信依頼 が発行 されるまでの時間を監視できます。
モニタ時間 はサーバ 定義ファイル にサーバー ごとに定義し てください。
監視時間 以上経過した場合は、サーバ に対して警告シグナル が送信 されます。

FIG.7B

自分のCPU のサーバ が相手のCPU にメッセージ受信依頼 を出すと、メッセージ が到着し ていない場合にはウエイト状態 になりますが、別のプロセス がサーバ にメッセージ送信依頼 を出すと処理 がリスタートさ れます。
[loca CPU] [server] [remote CPU] [message receive request] [message] [arrive] [wait status] [process] [server] [message transmission request] [process] [restart]
リモートCPU にメッセージ が着信 していた場合には、msgp にセーブされ、制御はサーバ に戻ります。
[remote CPU] [message] [arriva] [store] [server]
メッセージ の送信元CPU番号 は、メッセージ受信要求 のリターン値 で得ることができます。制御がサーバ に戻るときを起点 として、再度メッセージ受信依頼 が発行 されるまでの時間を監視できます。
[message] [CPU number] [message receive request] [return value] [server] [starting point] [message receive request] [line (or row)]
モニタ時間 はサーバ 定義ファイル にサーバー ごとに定義し てください。
[monitoring time] [server] [definition file] [server] [define]
監視時間 以上経過した場合は、サーバ に対して警告シグナル が送信 されます。
[monitoring time] [server] [warning signal] [transmission]

FIG.7C local CPU の server が remote CPU に message receive request を出すと、message が arrive していない場合には wait status になりますが、別の process が server に message transmission request を出すと process が restart されます。
remote CPU に message が arrival していた場合には、msgp に storage され制御は server に戻ります。
message の送信元 CPU number は、nessage receive request の return value で得ることができます。制御が server に戻るときを starting point として、再度 message receive request が発 line (or row) されるまでの時間を監視できます。
monitoring time は server definition file に server ごとに define してください。
monitoring time 以上経過した場合は、server に対して warning signal が transmission されます。

FIG.7D

自分のCPU[local CPU]のサーバ[server]が相手のCPU[remote CPU]にメッセージ受信依頼[message receive request]を出すと、メッセージ[message]が到着し[arrive]ていない場合にはウエイト状態[wait status]になりますが、別のプロセス[process]がサーバ[server]にメッセージ送信依頼[message transmission request]を出すと処理[process]がリスタートさ[restart]れます。
リモートCPU[remote CPU]にメッセージ[message]が着信し[arrival]ていた場合には、msgp にセーブさ[storage]れ、制御はサーバ[server]に戻ります。
メッセージ[message]の送信元CPU番号[CPU number]は、メッセージ受信要求[message receive request]のリターン値[return value]で得ることができます。制御がサーバ[server]に戻るときを起点[starting point]として、再度メッセージ受信依頼[message receive request]が発行[line (or row)]されるまでの時間を監視できます。
モニタ時間[monitoring time]はサーバ[server]定義ファイル[definition file]にサーバー[server]ごとに定義し[define]てください。
監視時間[monitoring time]以上経過した場合は、サーバ[server]に対して警告シグナル[warning signal]が送信[transmission]されます。

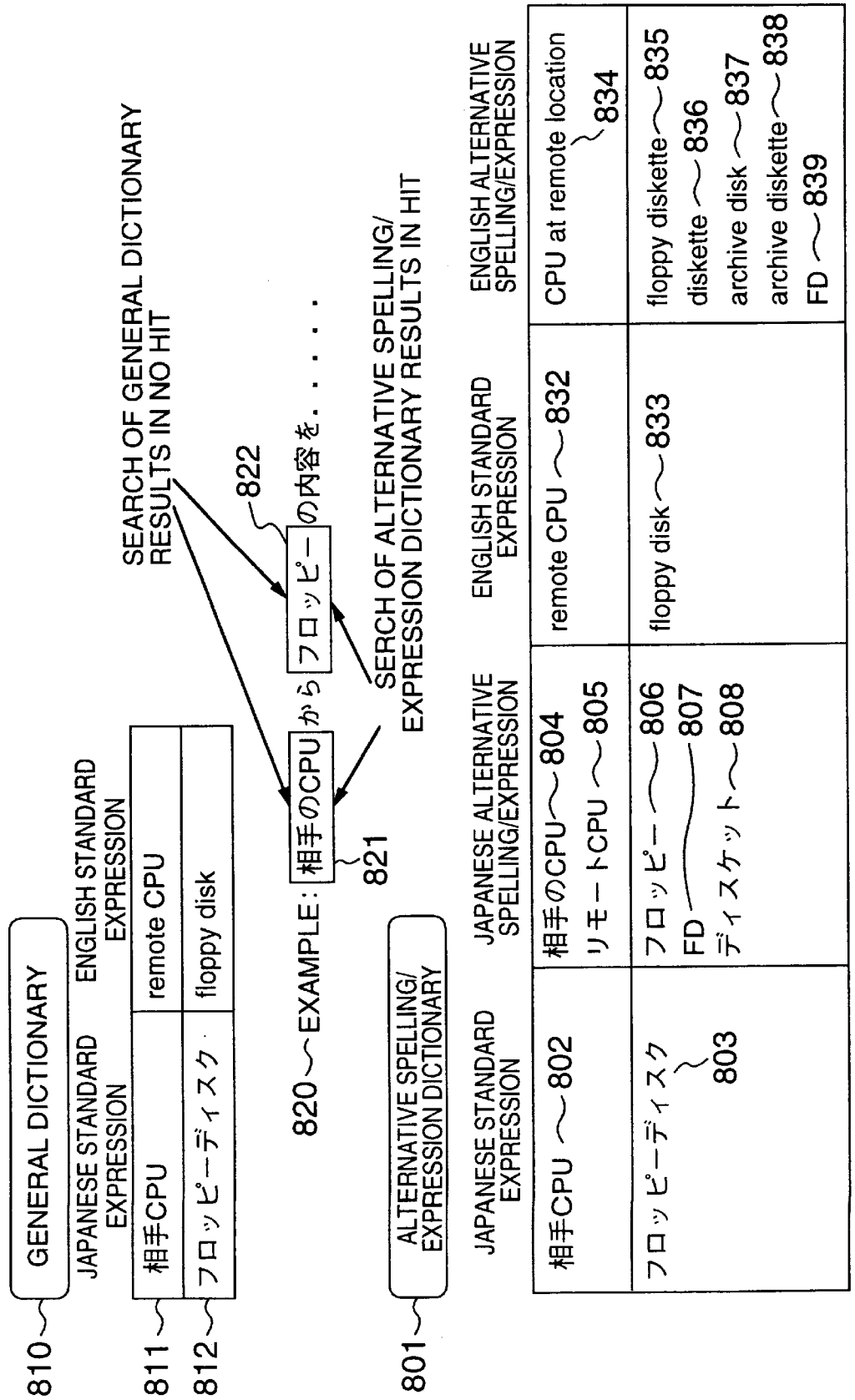

DOCUMENT COMPOSITION SUPPORTING METHOD AND SYSTEM, AND ELECTRONIC DICTIONARY FOR TERMINOLOGY

BACKGROUND OF THE INVENTION

The present invention relates to a document composition supporting technique, and more particularly to a document composition supporting method and system suitable for the use thereof for standardization of terms used in a technical document or the like. The expression of "standardization of term" or "terminological standardization" used in the present specification means the standardization (or unification) of a term in alternative spelling/expression (AS/E) into a term in standard expression (SE). The term in standard expression is a character string corresponding to, for example, a so-called entry of a dictionary. The alternative spelling/expression is a changed version of the standard expression. There may be a plurality of terms in alternative spelling/expression corresponding to one term in standard expression. Terms in alternative spelling/expression includes, for example, various synonyms of a term in standard expression, slangs such as business or commercial slangs, a character string including a mark expression of a prolonged sound in the Japanese syllable, and so forth. These terms can be regarded as being terms in alternative spelling/expression which are identical to the term in standard expression.

At the time of composition or editing of a Japanese or English document, at the time of document translation from Japanese to English or English to Japanese, or at the time of editing of the translated document, it is generally necessary to standardize these terms or target equivalent words used in the document.

Hitherto, however, the standardization of terms could not help relying upon the composer's (or writer's), reviser's, translator's or checker's knowledge or individual common sense. For example, a word " "フロッピーディスク (furoppī disuku)" in Japanese may be called " "フロッピー (furoppī)", "FD (efudi)", " "アーカイブディスケット (akaibu disuketto)", ディスケット (disuketto), " "フロッピーディスク (furoppii desuku)", and so forth. These terms are all correct but the co-existence thereof in the same document should be avoided. If the terminological standardization to " "フロッピーディスク (furoppi disuku)" is to be made, it is required that with the term " "フロッピーディスク (furoppī disuku)" taken as a standard expression, the other terms having expressions different from the standard expression should be changed (or standardized) into the term in standard expression.

In the case of English, the word of interest includes various expressions of "floppy disk", "floppy-disk", "diskette", "archive disk", "archive diskette", and so forth. In composing a document, the terminological standardization is required with any one of those expressions being taken as a standard expression.

Also, the terminological standardization at the time of document composition has hitherto been made by a document composer or writer. Accordingly, there is a problem that various technical terms may be used by individual writers or even by the same writer each time. Thus, there may result in that a reader such as a user, new comer, translator or the like has a misunderstanding about the contents of a given document, is perplexed thereabout or harbors suspicion against the document itself, a firm presenting the document, or products associated with the document.

Even if a document composer is initiated, by a manual, into the use of terms referring to a terminology dictionary prepared for terminological standardization, the attainment of complete terminological standardization is difficult since it is rarely the case that the document composer completely refers to the terminology dictionary or it is ordinary that the processing is eventually performed depending upon the composer's knowledge or individual common sense. Also, it is general that no particular record is made as to which one of a plurality of terms expressing the same matter did the composer use. Therefore, when somebody checks the composed document, the checker will know the used term or the unstandardized term through the conjecture of the whole by the desultory reading of the document.

Though the use of an electronic dictionary by a computer for terminological standardization may be considered, all of used softwares is a searching or viewing software. Therefore, in the case where the electronic dictionary includes no character string for which the search is to be made, a user will take a wasteful time and labor for the search and will be subjected to stress. Fundamentally, this case is substantially the same in effect as the case where the reference is made to a paper-like (or book-like) terminology dictionary or lexicon.

Search/replacement, which is one function of a word processor, is known as another method for making the standardization of terms in a document to be composed or revised. Though the search/replacement method is suitable in the case where several different character strings or words of the same kind are to be replaced, this method cannot make a comprehensive search/replacement for plural kinds of unspecified character strings. Sentence check is also known as one function of a word processor. With this function, it is possible to replace inadequate terms by terms selected as being standard. However, it is required for the utilization of the sentence checking function that terms in standard expression and terms in alternative spelling/expression should be inputted one by one manually into a dictionary in a sentence checking software beforehand. Namely, the mere input of an electronized terminology dictionary does not suffice for utilization of the sentence checking function.

In the case of translation between the Japanese language and a foreign language, for example, in the case of Japanese-to-English translation, it is general that a Japanese text and a paper-like terminology dictionary (or parallel translation list) are supplied to a translator. The terminology dictionary includes Japanese standard expressions and their English equivalents (English standard expressions) side by side. The translator will refer to the dictionary to search for terms when he or she does not know or not be sure of the terms for the translation. Also, it is general that no record is made as to which originals the used target equivalents correspond to. Therefore, another person checking the result of translation can know the correspondence of the originals to the used target equivalents only through the conjecture of the whole, for example, by the desultory reading of the result of translation.

In general, translated sentences are checked by a checker after translation. The primary duty of the translation checker is to check translation omissions, mistranslation, grammatical correctness and meaning. But, a further time and labor are required for checking whether the terms in a terminology dictionary or parallel translation list supplied to the translator were correctly used or not. If all technical terms used in the original text are written in standard expression, the checking of terms will be easy. However, in the case where the original text is written including alternative spelling/ expressions, there will result in that the translator uses another target equivalent for a term written in alternative spelling/expression since the term written in alternative spelling/expression is not found out even if the reference is made to the terminology dictionary. If there are frequently occurred the cases where the translator cannot find out an intended term in spite of the reference to the terminology dictionary, the translator may have a suspicion that the reference to the terminology dictionary is wasteful. This will result in the decrease of the number of times of reference to the terminology dictionary and will ultimately result in that the translator uses target equivalents relied upon his or her own knowledge in disregard of the terminology dictionary.

In the case of Japanese-to-English translation, there is known a method in which English equivalents are retrieved using a dictionary software by a computer to take them into the translation. In this method, however, it is required that a Japanese character string should be highlighted and the Japanese language should be inputted to search an electronic dictionary. Therefore, this method has no essential difference from the case where a person refers to a paper-like terminology dictionary.

Machine translation is also known. In a method based on the machine translation, it is possible to make the correspondence of necessary target equivalents if standard expression and alternative spelling/expression are registered beforehand in an electronic dictionary used for machine translation. In general, however, since the translation of the whole of sentences obtained by the machine translation includes many unnatural, inadequate and/or incorrect expressions and therefore has a poor quality of translation, the result of translation is not suited for as use as a technical document, specification or the like which requires a reliability done by a professional translator. Also, however, completely an electronic dictionary for machine translation may be consolidated, it is difficult to make translation with terminological standardization.

As mentioned above, the manual standardization terms or target equivalents at the time of composition or editing of a Japanese or English document, at the time of document translation from Japanese to English or English to Japanese, or at the the time of editing of the translated document involves a mental and physical labor as well as the difficulty of judgement as to where in the composed or translated document did the composer or translator use terms or target equivalents designated by a terminology dictionary and/or which ones of designated terms or target equivalents did the composer or translator not use and hence whether or not the replacement is necessary. Also, even if an electronic or a paper terminology dictionary containing a rich vocabulary is prepared, the dictionary is not sufficiently used in many cases and there remains no evidence of whether or not the dictionary was used. Therefore, a question arises as to the quality level and control of a composed or translated document.

SUMMARY OF THE INVENTION

An object of the present invention made for solving the above-mentioned problems in document composition or translation work is to provide a document composition supporting method and system for support of the editing of a document, in which terms in alternative spelling/expression are replaced by terms in standard expression without omission.

Another object of the present invention is to provide a document composition supporting method and system for support of the editing of a document, in which the checking can be made as to how many terms registered in a terminology dictionary did the document use and the evidence of the process and result of document editing can be left.

A further object of the present invention is to provide a document composition supporting method and system for support of the translation of a document from a source language to a target language, in which correct standard expression of the target language can be applied by a translator even to terms of alternative spelling/expression in the source language with no consciousness of the distinction between standard expression and alternative spelling/expression, thereby making it possible to improve the accuracy of translation as far as such the alternative spelling/expressions are inputted in the terminology dictionary having alternative spelling/expression columns.

A furthermore object of the present invention is to provide a document composition supporting method and system for support of the translation of a document from a source language to a target language, in which the evidence of the process and result of translation can be recorded.

A still further object of the present invention is to provide an electronic terminology dictionary which can be used for the support of editing and translation of a document.

To that end, one aspect of the present invention provides a document composition supporting method and system for supporting the editing of any given document by use of an electronic terminology dictionary while displaying the given document on a display unit. The electronic terminology dictionary is generated so that at least terms in standard expression and terms in alternative spelling/expression corresponding thereto are registered in association with each other, at least one term in alternative spelling/expression being registered corresponding to each of the terms in standard expression. The given document is inputted and searched by use of the electronic terminology dictionary for the terms in the inputted document which match with the terms in standard expression and the terms in alternative spelling/expression registered in the electronic terminology dictionary. The document is revised on the basis of the result of search so that the terms in the document matching with the terms in the alternative spelling/expression registered in the electronic terminology dictionary are replaced by the corresponding terms in standard expression registered in the electronic terminology dictionary.

On the basis of the result of search of the document, the terms in the document matching with the terms in standard expression registered in the electronic terminology dictionary and the terms in the document matching with the terms in alternative spelling/expression registered in the electronic terminology dictionary may be displayed on said display unit by use of different kinds of colors and/or underlines, respectively, so that they are distinguished from each other and from the other portions of said document.

The terms in the document matching with the terms in alternative spelling/expression registered in the electronic terminology dictionary may be successively or en bloc replaced by the corresponding terms in standard expression in accordance with an editor's determination.

After the replacement, the number of terms in the inputted document matching with the terms in standard expression, the number of terms in the inputted document matching with the terms in alternative spelling/expression, and the number of terms in the inputted document matching with the terms in alternative spelling/expression replaced by the corresponding terms in standard expression may be determined as the record of search and replacement.

The electronic terminology dictionary may have an explanation field including at least the explanation of the term registered corresponding to each of specified standard expression. In the case where the specified term is included in the inputted document, the specified term is displayed in a form distinguishable from other terms so that the reference can be made to the contents of the corresponding explanation of the term registered in the explanation field of the electronic terminology dictionary.

The electronic terminology dictionary may include a character string for sorting corresponding to each of the terms in standard expression. In response to the input of the reading of that term by Japanese kana characters, a Japanese character string for sorting is generated by deleting dakuten (voiced sound mark) and handakuten (p-sound mark) from the inputted kana characters, and converting small size kana characters representative of sokuon (double consonant) and yoon (contracted sound) into normal size kana characters. In response to the input of the English reading of that term by alphabetic characters, an alphabetic character string for sorting is generated by converting capital letters into small letters and deleting symbols inclusive of space.

Another aspect of the present invention provides an electronic terminology dictionary used for the support of editing and translation of a document, in which terms of standard expression in a source language, terms of the source language in alternative spelling/expression corresponding to the terms of the source language in standard expression, standard expression of a target language, and the alternative spelling/expression of the target language corresponding to the target equivalents of the target language in standard expression are data-based, at least one term of the source language in alternative spelling/expression being provided corresponding to each of the terms of the source language in standard expression, and at least one target equivalent of the target language in alternative spelling/expression being provided corresponding to each of the target equivalents of the target language in standard expression.

A further aspect of the present invention provides a document composition supporting method and system for supporting the translation of any given document of a source language from the source language to a target language by use of an electronic terminology dictionary while displaying the given document on a display unit. The electronic terminology dictionary is generated so that at least terms of the source language in standard expression, terms of the source language in alternative spelling/ expression corresponding to the terms of the source language in standard expression, and target equivalents of the target language in standard expression corresponding to the terms of the source language in standard expression are registered in association with to each other, at least one term of the source language in alternative spelling/expression being registered corresponding to each of the terms of the source language in standard expression. The given document is inputted and searched by use of the electronic terminology dictionary for terms in the inputted document matching with the terms of the source language in standard expression and the terms of the source language in alternative spelling/expression registered in the electronic terminology dictionary to allow the application of target equivalents of the target language in standard expression corresponding to the matching terms in the document.

On the basis of the result of search of the document, sentences in the document may be successively displayed on the display unit with each at least one sentence being followed by the arrangement of target equivalents of the target language in standard expression corresponding to the matching terms in the at least one sentence so that the terms in the at least one sentence matching with the terms of the source language in standard expression and the terms of the source language in alternative spelling/expression registered in the electronic terminology dictionary are displayed by use of at least one kind of color and/or underline in a manner distinguished from the other portions of the at least one sentence and the target equivalents of the target language in standard expression corresponding to the matching terms in the at least one sentence are displayed in the order of occurrence of the matching terms in the at least one sentence.

Alternatively, on the basis of the result of search of the document, the document may be displayed on the display unit so that each of the terms in the document matching with the terms of the source language in standard expression and the terms of the source language in alternative spelling/ expression registered in the electronic terminology dictionary is immediately followed by the target equivalent of the target language in standard expression corresponding to that matching term in the document.

Alternatively, on the basis of the result of search of the document, the document may be displayed on the display unit so that each of the terms in the document matching with the terms of the source language in standard expression and the terms of the source language in alternative spelling/ expression registered in the electronic terminology dictionary is replaced by the target equivalent of the target language in standard expression corresponding to that matching term in the document.

Alternatively, on the basis of the result of search of the document, the document may be displayed on the display unit so that each of the terms in the document matching with the terms of the source language in standard expression and the terms of the source language in alternative spelling/ expression registered in the electronic terminology dictionary is color changed and/or underlined to allow a translator to refer to the terminology dictionary for the application of the target equivalent of the target language in standard expression corresponding to that matching term in the document.

The number of target equivalents of the target language in standard expression applied to terms in the inputted document matching with the terms of the source language in standard expression and the terms of the source language in alternative spelling/expression registered in the electronic terminology dictionary, the number of ones of the applied target equivalents of the target language subjected to use as translated terms, and the number of ones of the applied target equivalents of the target language subjected to no use as translated terms may be determined as the record of translation.

The electronic terminology dictionary may has an explanation filed including at least the translation know how registered corresponding to each of specified ones of the target equivalents of the target language in standard expression, and wherein in the case where the specified target equivalent is applied, the specified target equivalent is displayed in a form distinguishable from other target equivalents so that the reference can be easily made to the contents of the corresponding translation know how registered in the explanation field of the electronic terminology dictionary.

Other objects, features and advantages of the present invention will become apparent from the following description of embodiments in conjunction with the accompanying drawings.

BRIEF DESCRIPTION OF THE DRAWINGS

FIGS. 3A and 3B are tables for explaining the construction of an electronic terminology dictionary used in the embodiment of the present invention;

FIGS. 4A to 4D are diagrams for explaining a first embodiment of a process according to the present invention in conjunction with the case where the support is made for terminological standardization of a Japanese document;

FIGS. 5A to 5D are diagrams for explaining a second embodiment of a process according to the present invention in conjunction with the case where the support is made for terminological standardization of an English document;

FIGS. 6A to 6D are diagrams for explaining a third embodiment of a process according to the present invention in conjunction with the case where the support is made for Japanese-to-English translation with terminological standardization;

FIG. 6E is a flowchart for explaining the operation of the third embodiment;

FIGS. 7A to 7D are diagrams for explaining other methods for application of English equivalents at the time of translation support explained in conjunction with FIG. 6B; and FIG. 8 is a diagram for explaining a difference in document composition support between a terminology dictionary according to the present invention and the conventional or general dictionary.

DESCRIPTION OF THE PREFERRED EMBODIMENTS

Embodiments of a document composition supporting system according to the present invention will now be described in detail by use of the accompanying drawings.

Figure 1:
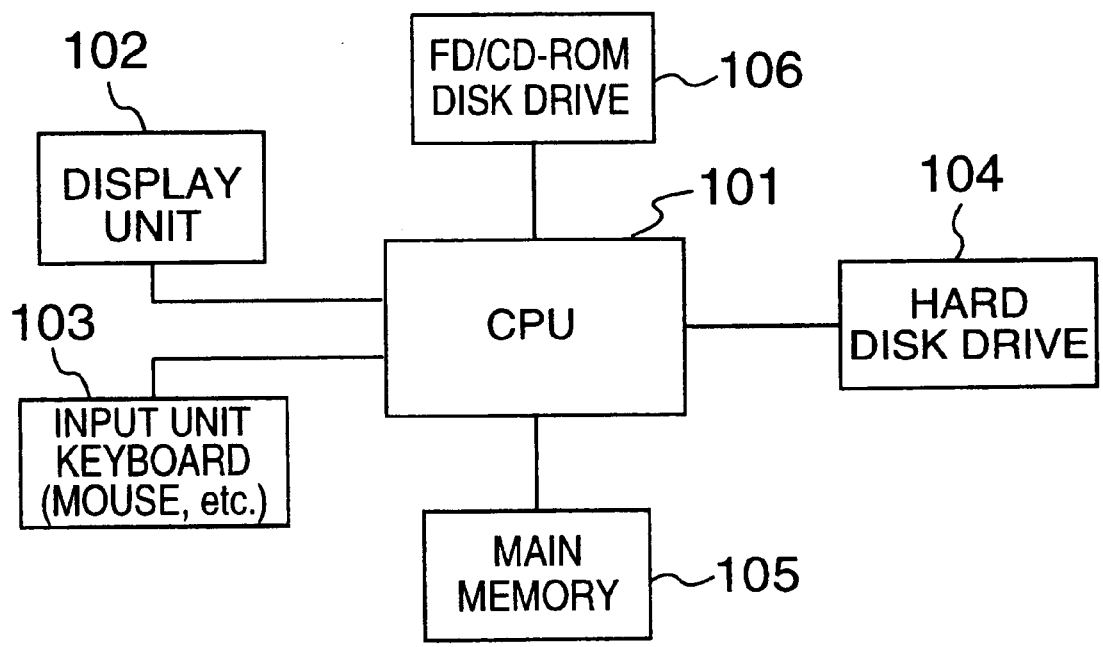
FIG. 1 is a block diagram showing an example of the construction of a computer system for realizing the present invention.
Figure 2:
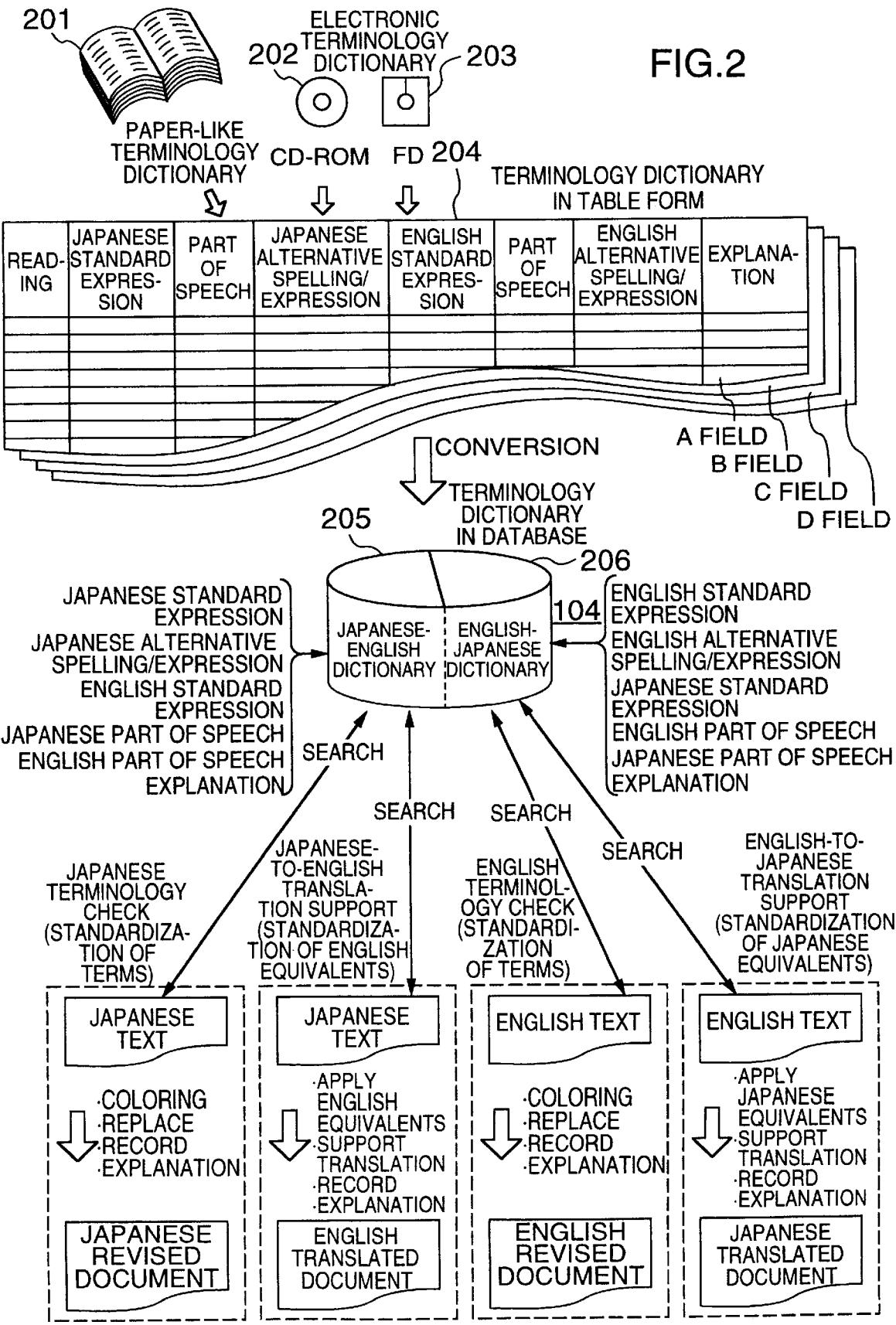
FIG. 2 is a diagram for explaining the concept of a document composition supporting system according to an embodiment of the present invention.

Referring to FIG. 1 showing a computer system for realizing the present invention and FIG. 2 illustrating the concept of a document composition supporting system according to an embodiment of the present invention, reference numeral 101 denotes a central processing unit (CPU), numeral 102 a display unit, numeral 103 an input unit, numeral 104 a hard disk drive, numeral 105 an main memory, numeral 106 a disk drive such as a floppy disk and/or a CD-ROM, numeral 201 a paper-like (or book-like) conventional terminology dictionary, numeral 202 a CD-ROM of an electronic terminology dictionary, numeral 203 a floppy disk of an electronic terminology dictionary, numeral 204 sample formats of electronic terminology dictionaries generated in a table form in accordance with the present invention, numeral 205 a Japanese-English dictionary of data base in the computer system, and numeral 206 an English-Japanese dictionary 11.

As shown in FIG. 1, the processor for realizing the present invention includes the CPU 101 which controls the overall processing performed by the processor, the display unit 102 which is constructed by a CRT, LCD or the like, the input unit 103 which is provided with a keyboard, mouse or the like, the hard disk drive 104 which stores data necessary for the processing and so forth, the main memory 105 which stores an OS (operating system), application program or the like and is used for the processing operation of the CPU 101, and the disk drive 106 for floppy disk drive and/or CD-ROM drive which take(s) in data from the exterior or outputs data to the exterior. The processor may be a general-purpose personal computer having a document processing function.

The document composition supporting system according to the embodiment of the present invention can be used for supporting the standardization of terms in a composed document or translated document. In the following, the support at the time of composition of a Japanese document, the support at the time of composition of an English document and the support at the time of translation from Japanese to English will be explained by way of example. In the document composition supporting system according to the embodiment of the present invention the conceptual diagram of which is shown in FIG. 2, the contents of an electronic terminology dictionary 204 generated or inputted from the contents of a paper-like terminology dictionary 201 or the like in accordance with the present invention and stored in a CD-ROM 202, a floppy disk 203 or the like are loaded into the hard disk drive 104 through the disk drive 106. This table-formed terminology dictionary 204 is used to perform the support for terminological standardization in a document separately inputted through the disk drive 106 from a floppy disk or the like and displayed on the display unit 102, or the support for terminological standardization at the time of Japanese-to-English or English-to-Japanese translation.

A document composition supporting program for realizing the present invention is stored into the main memory 105 of the computer system such as a personal computer when it is activated. The terminology dictionary 204 is read into the hard disk drive 104 so that it is stored into the hard disk drive 104 in a data base form separated into a Japanese-English dictionary 205 which is used for both a supporting process for a Japanese document terminological standardization and a supporting process for Japanese-to-English translation, and an English-Japanese dictionary 206 which is used for both a supporting process for an English document terminological standardization and a supporting process for English-to-Japanese translation. The generation of the Japanese-English dictionary 205 and the English-Japanese dictionary 206 from the terminology dictionary 204 will be mentioned later on.

Next, the construction of the terminology dictionary 204 (or electronic glossary characteristic of the present invention) is explained referring to FIGS. 2 and 3.

It is preferable that the terminology dictionary 204 is prepared for each of the fields or genres (A, B, C) to which documents to be composed belong. The data structure of each terminology dictionary includes at least data fields for registering "JAPANESE READING OF TERM", "JAPANESE STANDARD EXPRESSION", "JAPANESE PART OF SPEECH", "JAPANESE ALTERNATIVE SPELLING/EXPRESSION", "ENGLISH STANDARD EXPRESSION", "ENGLISH PART OF SPEECH", "ENGLISH ALTERNATIVE SPELLING/EXPRESSION", "JAPANESE READING FOR SORTING", "ENGLISH SPELLING FOR SORTING" and "EXPLANATION", respectively.

"READING OF TERM" represents the reading of a term in "JAPANESE STANDARD EXPRESSION" by hiragana (the cursive Japanese syllabary) or katakana (the straight-lined or square Japanese syllabary), and "JAPANESE STANDARD EXPRESSION" corresponds to word(s)/term (s) or entry. "JAPANESE PART OF SPEECH" represents the part of speech of the term in "JAPANESE STANDARD EXPRESSION" and is indicated by a code associated with the corresponding part of speech.

"JAPANESE ALTERNATIVE SPELLING/EXPRESSION" indicates a term used as being identical to the term in "JAPANESE STANDARD EXPRESSION". A plurality of terms in alternative spelling/expression can be registered corresponding to one term in standard expression. For example, " "フロッピー (sutoa)", " "相手の (sutoa)", "保存(hozon)" and " "セーブ (sēbu)" may be used as terms which have the same meaning as but alternative spelling/expression from a term " "格納 (kakuno; "store" in English)" in "JAPANESE STANDARD EXPRESSION", as shown in the second line of FIG. 3. These terms are registered in the field "JAPANESE ALTERNATIVE SPELLING/EXPRESSION".

"ENGLISH STANDARD EXPRESSION" indicates an English equivalent for the term in "JAPANESE STANDARD EXPRESSION". A plurality of corresponding equivalents for the respective parts of speech may be registered together with codes associated with the corresponding parts of speech.

Like "JAPANESE ALTERNATIVE SPELLING/EXPRESSION", "ENGLISH ALTERNATIVE SPELLING/EXPRESSION" indicates a term used as being identical to the term in "ENGLISH STANDARD EXPRESSION" and a plurality of terms in alternative spelling/expression can be registered corresponding to one term in standard expression.

The fields "JAPANESE READING FOR SORTING" and "ENGLISH SPELLING FOR SORTING" are used in the case where indexes are sorted in the order of the Japanese (kana) syllabary and in alphabetical order, respectively, for updating and management of the terminology dictionary 204 caused by the addition, change and so forth of terms. These fields can be set automatically from the fields "JAPANESE READING" and "ENGLISH STANDARD EXPRESSION" respectively.

For Japanese, sorting as in a Japanese language dictionary is proper. However, even if the reading in hiragana or katakana is sorted in ascending order, the sorting as expected is not possible in the case where there are small size characters "っ", "ゃ", "ゅ", "ょ", "ぁ", "ぃ", "ぅ", "ぇ" and "ぉ" representing sokuon (double consonant) and yoon (contracted sounds), syllable characters representing dakuon (voiced sound or kana having dakuon mark "゛" on the right shoulder), syllable characters representing handakuon (p-sound or kana having handakuon mark "o" on the right shoulder), and so forth. Also, in the case where English alphabetic characters and numeric characters are included in a character string in the reading, for example, "ABC" may be loaded as " "えーびーしー (ēbishī)" and "101" is read as not " "ひゃくいち (hyakuichi; "one hundred and one" in English)" but " いちぜろいち (ichizeroichi; "one zero one" in English)". Accordingly, it is troublesome to manually input the reading to the field "JAPANESE READING FOR SORTING" and there may be the case where correct sorting is not made. Therefore, the field "JAPANESE READING FOR SORTING" is automatically generated from the field "READING OF TERM" through a conversion table.

Namely, in the case where the reading by Japanese is inputted, the Japanese reading for sorting is generated by removing dakuon mark "゛" and handakuon mark "o" from inputted characters, converting small size kana characters representative of sokuon (double consonant) and yoon (contracted sounds) into normal size kana characters, and converting alphabetic characters and numeric characters into predetermined reading through a conversion table.

For "ENGLISH STANDARD EXPRESSION" as English term(s)/word(s) too, even if they are sorted in ascending order as they are, the order of words as in an English language dictionary will not be attained since there are capital and small letters as well as marks including hyphen, space and so forth. If the sorting is not made as expected by a user, there may be the case where an intended word is not found out at the expected line of the table. Accordingly, for the field "ENGLISH SPELLING FOR SORTING" too, in the case where the spelling of terms in "ENGLISH STANDARD EXPRESSION", the English spelling for sorting is automatically generated by converting capital letters into small letters and removing the marks inclusive of the space.

The filed "EXPLANATION" includes explanation of the term and/or translation know-how in conjunction with each of specified ones of the terms registered in the terminology dictionary 204. The contents of the field "EXPLANATION" can be inputted freely as much as a limit of application program. The contents registered in the field "EXPLANATION" are useful to a document composer or translator for editing, translation and/or checking of a document.

When the terminology dictionary 204 having the above construction is loaded into the hard disk drive 104, a database of the Japanese-English dictionary 205 and the English-Japanese dictionary 206 are separately generated in such a manner that the Japanese-English dictionary 205 is constructed by extracting the fields "JAPANESE STANDARD EXPRESSION", "JAPANESE ALTERNATIVE SPELLING/EXPRESSION", "ENGLISH STANDARD EXPRESSION", "JAPANESE PART OF SPEECH", "ENGLISH PART OF SPEECH", and "EXPLANATION" from the terminology dictionary 204, and the English-Japanese dictionary 206 is constructed by extracting the fields "ENGLISH STANDARD EXPRESSION", "ENGLISH ALTERNATIVE SPELLING/EXPRESSION", "JAPANESE STANDARD EXPRESSION", "ENGLISH PART OF SPEECH", "JAPANESE PART OF SPEECH" and "EXPLANATION" from the terminology dictionary 204.

Next, a first embodiment of a process according to the present invention will be explained in reference to FIGS. 4A to 4E by way of example in conjunction with the case where the support is made for terminological standardization of a Japanese document.

Figure 4E:
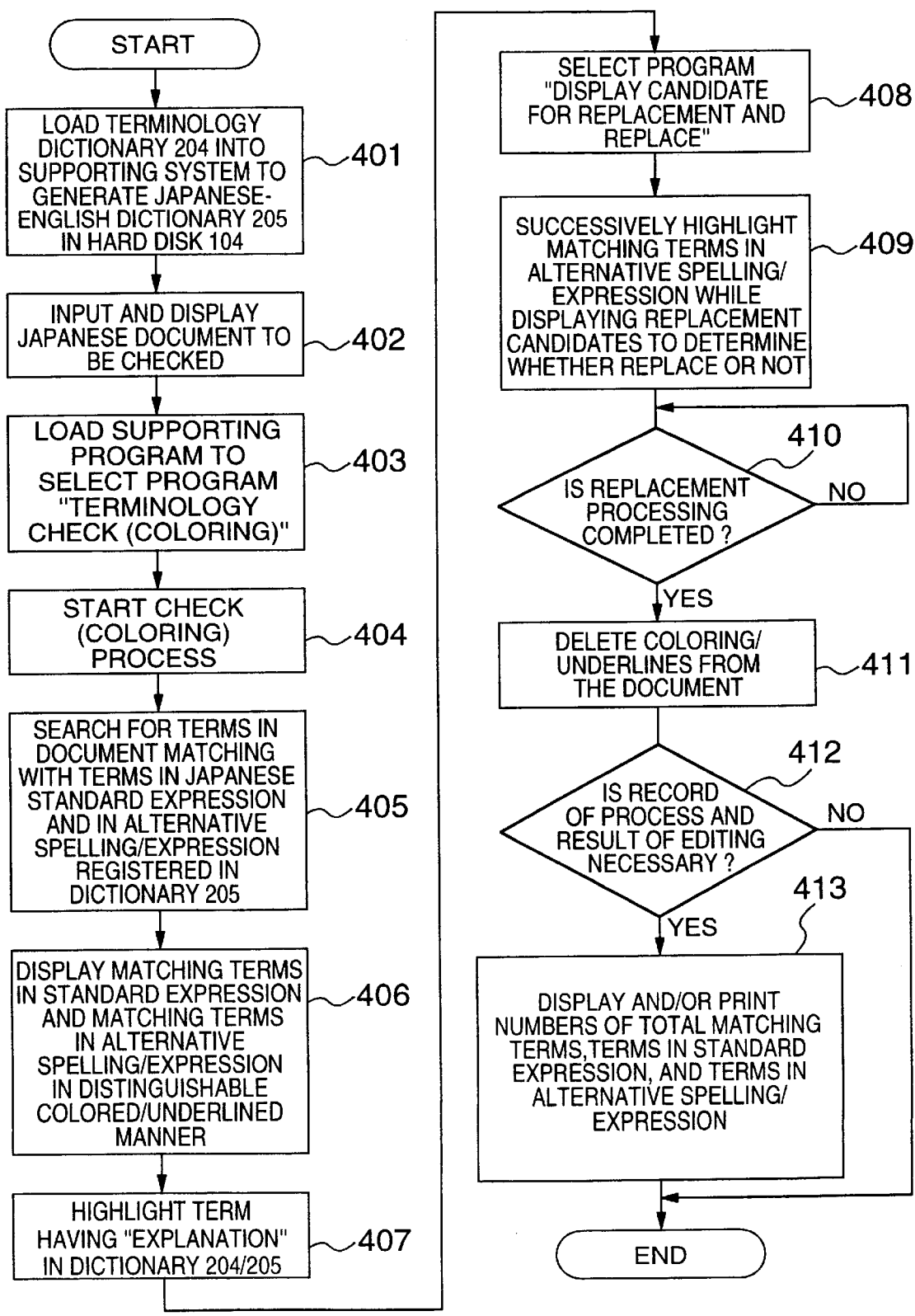
FIG. 4E is a flowchart for explaining the operation of the first embodiment.

First, a desired terminology dictionary 204 having such a construction as mentioned above is generated and is loaded from the CD-ROM 202 or the floppy disk 203 or the like into the hard disk drive 104 of the computer system of FIG. 1 through the disk drive 106 so that a Japanese-English dictionary 205 is generated in the hard disk drive 104 (step 401 in FIG. 4E).

Next, any given or beforehand composed document (or text) to be checked, that is, a document to be subjected to terminological standardization is loaded through the disk drive 106 from a floppy disk or the like having the document stored therein and is displayed on the display unit 102, for example, as shown in FIG. 4A (step 402).

In this state, a desired program name displayed in a tool or window menu form outside of a document display area of the display unit 102 is selected or clicked by a mouse to start a desired supporting program for realizing the present system (step 403). The supporting program can be implemented by add-in software (program) described in a macro-language to a word processing software such as "MS-WORD" (the trade name of Microsoft Corporation) or the like in functions. Thereby, the supporting program displays the next processing menu on the display unit 102. In the present example, a "JAPANESE TERMINOLOGY CHECK" button in a menu is clicked and a "TERMINOLOGY CHECK (COLORING)" button is clicked.

Thereby, the supporting program starts a process for checking terms from character strings in the document displayed as shown in FIG. 4A and marking them by color(s) and/or underline(s) (step 404). In this terminology check and coloring process, the reference is made to the Japanese-English dictionary 205 in the hard disk drive 104 so that the character strings in the document are searched for terms matching with to terms registered in the fields "JAPANESE STANDARD EXPRESSION" and "JAPANESE ALTERNATIVE SPELLING/EXPRESSION" of the database dictionary 205 (step 405), and the result of search is displayed in a color marking manner so that terms in standard expression and terms in alternative spelling/expression are marked by color(s) and/or underline(s) (step 406).

Now assume that the document in a taken-in condition shown in FIG. 4A (or the original text) is displayed by black letters. When the search processing is performed and a term registered in the field "JAPANESE STANDARD EXPRESSION" or "JAPANESE ALTERNATIVE SPELLING/ EXPRESSION" matches with that in the document, the color of that term in the document is changed. For example, in the case where the matching with a term in "JAPANESE STANDARD EXPRESSION" is obtained, the color of the corresponding term in the document is changed to light blue. In the case where the matching with a term in "JAPANESE ALTERNATIVE SPELLING/EXPRESSION" is obtained, the color of the corresponding term in the document is changed to pink. Portions in the document having no matching remain displayed by black, as they are.

In the above, the display color is changed for the case where the matching with the term in "JAPANESE STANDARD EXPRESSION" is obtained and the case where the matching with the term in "JAPANESE ALTERNATIVE SPELLING/EXPRESSION" is obtained. The present embodiment can also be constructed such that a plurality of states of each of the matching with a term in "JAPANESE STANDARD EXPRESSION" and the matching with a term in "JAPANESE ALTERNATIVE SPELLING/ EXPRESSION" are displayed by use of a plurality of colors, respectively, so that they can be discriminated by the writer (or checker).

For example, two colors of red and pink as red-series colors, when the matching with terms in "JAPANESE ALTERNATIVE SPELLING/EXPRESSION" is obtained, are used for highlighting character strings in order to suggest the replacement by standard expression. Also, when the matching with terms in "JAPANESE STANDARD EXPRESSION" is obtained, two colors of light blue and yellowish green as blue-series colors are used. The light blue suggests no need for displacement. The pink of the red-series colors indicates the complete matching with a term in "JAPANESE ALTERNATIVE SPELLING/ EXPRESSION", and the red indicates that the matching with a term in "JAPANESE ALTERNATIVE SPELLING/ EXPRESSION" is obtained but the corresponding character string includes laterally reduced half-sized alphabetic, numeric and/or katakana characters which are to be replaced by normal (full) size characters. On the other hand, the light blue of the blue-series colors indicates the complete matching with a term in "JAPANESE STANDARD EXPRESSION", and the yellowish green indicates that the matching with a term in "JAPANESE STANDARD EXPRESSION" is obtained but the corresponding character string includes laterally reduced half-sized alphabetic, numeric and/or katakana characters which are to be replaced by normal (full) size characters.

At the same time, those terms may be applied with differently configured (or different kinds of) underlines. Thereby, the states of matching can be indicated even in the case where it is only monochromatic display which the display unit 102 can provide. The underline is applied to a bunch or string of characters in the dictionary. It is preferable that the kind of the used underline is changed in accordance with the used color with the use on a monochromatic screen and/or conveniences for color-blind or incompletely color-blind persons being taken into consideration. For example, a double-line and a wave-line are allotted to the red-series colors while a single-line and a broken-line are allotted to the blue-series colors. These colors and underlines can be set as initial values or conditions. A user can make free selection from among, for example, sixteen kinds of colors and ten kinds of underlines in case of for example, MS-Word application program (the trade name of Microsoft Corporation).

When the above-mentioned search processing is completed, the displayed document turns into a condition, as shown in FIG. 4B, in which the states of matching with terms registered in the terminology dictionary, that is, the matching with terms in "JAPANESE STANDARD EXPRESSION" and the matching with terms in "JAPANESE ALTERNATIVE SPELLING/EXPRESSION" can be distinguished at a look on the basis of the color-marked document on the display 102 and the configurations of underlines. In the shown example, it is indicated that the terms " ″自分のCPU″ " ("local CPU" in English), " ″相手のCPU″ " ("remote CPU" in English) and so forth result in the matching with those in "JAPANESE ALTERNATIVE SPELLING/EXPRESSION" and the terms " ″到着″ " ("arrive" in English), " ″定義″ " ("define" in English) and so forth result in the matching with those in "JAPANESE STANDARD EXPRESSION".

A term for which any contents are registered in the field "EXPLANATION" of the dictionary may be displayed in a highlighted manner, for example, in bold italic type so that it is distinguished from the other terms (step 407). This can be made through the search of the document in step 405 to 406.

After the above-mentioned coloring process is completed, the supporting program displays a message indicating the completion and the writer clicks a "DISPLAY CANDIDATE FOR REPLACEMENT AND REPLACE" button (step 408).

Thereby, the supporting program brings terms matching with the terms in "JAPANESE ALTERNATIVE SPELLING/EXPRESSION" into highlighted (colored/ underlined) characters (words/terms) from the top of the document shown in FIG. 4B while displaying a replacement candidate word(s), that is, a term in a standard expression corresponding to the alternative spelling/expression in order to inquire of the writer about whether or not the replacement by that candidate word should be made (step 409). This inquiry is made by displaying a term in "JAPANESE STANDARD EXPRESSION" while displaying the indication ("YES"/"NO" or the like) of whether or not the replacement should be made.

In the case where the writer desires to replace the highlighted term by the term in "JAPANESE STANDARD EXPRESSION", the worker clicks a "YES" button.

Thereby, the highlighted term is replaced by the term in "JAPANESE STANDARD EXPRESSION" so that the corresponding term after replacement turns into a term in "JAPANESE STANDARD EXPRESSION" displayed by blue. At the same time, the next term matching with a term in "JAPANESE ALTERNATIVE SPELLING/ EXPRESSION" is highlighted and a similar processing is performed. For a term represented in bold italic type, the writer positions a cursor at that term and clicks a "DISPLAY EXPLANATION" button, thereby making it possible to refer to the contents (explanation of term and/or translation know-how) registered in the field "EXPLANATION" of the dictionary 204 so that the registered contents are useful for the writer's judgement as to whether or not the replacement should be made. After the replacement processing for all the terms is completed (step 410), the document is displayed as shown in FIG. 4C.

After confirming the completion of the replacement processing for all the terms, the writer performs a processing for returning the color to the original color and deleting underlines applied to the terms in the document so that the document is displayed, for example, by black as shown in FIG. 4D (step 411) and thereafter performs a processing for printing or preserving the document, as required.

The process and result of the above-mentioned terminological standardization in document can be recorded. For example, the number of terms in the original text matching with terms in standard expression, the number of terms in the original text matching with terms in alternative spelling/ expression, and the total of term are displayed and/or printed (step 413). When the step 413 is not necessary (step 412), the supporting process is completed. The dictionary (205) generating step 401 is performed in accordance with the disclosure of the foregoing embodiment.

Next, a second embodiment of a process according to the present invention will be explained in reference to FIGS. 5A to 5D by way of example in conjunction with the case where the support is made for terminological standardization of an English document.

Since a processing for supporting the terminological standardization of an English document is substantially similar to the above-mentioned processing for supporting the terminological standardization of a Japanese document and is different therefrom only in that an "ENGLISH TERMINOLOGY CHECK" button is clicked in lieu of the "JAPANESE TERMINOLOGY CHECK" button and the English-Japanese dictionary 206 is used in lieu of the Japanese-English dictionary 205, the explanation thereof will be omitted and only an example of the document is shown in FIGS. 5A to 5D. In the case of English, there is no judgement of a normal full-sized character or a laterally reduced half-sized character but it is necessary to consider a capital letter at the head of a sentence, inflection (-s, -ed, -ing, -er and so forth). The contents of change of the document shown in FIGS. 5A to 5D are the same as those shown in FIGS. 4A to 4D.

According to the above-mentioned process in the first (or second) embodiment for supporting the terminological standardization of a Japanese (or English) document or text, a terminology dictionary can be used perfectly to allow the checking as to how many terms in the terminology dictionary did the Japanese (or English) text include and to allow terms written in alternative spelling/expression to be replaced by the corresponding terms in standard expression without omission.

Also, it is possible to leave the evidence of the process and result of terminological standardization. Further, it becomes possible to surely make the terminological standardization without relying upon the writer's knowledge or individual common sense. Furthermore, in the case where a checker checks the document, the checking can be performed concentrating attention upon the matters other than the terms. Therefore, the efficiency of checking can be improved. In other words, the overhead required for checking can be reduced.

Next, a third embodiment of a process according to the present invention will be explained in reference to FIGS. 6A to 6E by way of example in conjunction with the case where the support for terminological standardization and translation is made when a Japanese document is translated from Japanese to English.

In a manner similar to that in the embodiment explained in conjunction with FIGS. 4A to 4E, a desired terminology dictionary 204 is loaded from the CD-ROM 202, and/or the floppy disk 203 into the hard disk drive 104 through the disk drive 106 so that a Japanese-English dictionary 205 is generated in the hard disk drive 104 (step 601 in FIG. 6E).

Next, any given or beforehand composed Japanese document to be translated is loaded through the disk drive 106 from a floppy disk or the like having the document stored therein and is displayed on the display unit 102, for example, as shown in FIG. 6A (step 602).

In this state, a desired supporting program is started by selecting a program name displayed in a window menu form outside of a document display area of the display unit 102. Thereby, the supporting program displays the next processing menu on the display screen. In the present example, a program "APPLY ENGLISH EQUIVALENT (standard expression)" button in the menu is selected or clicked (step 603).

Thereby, the supporting program starts a process for applying English equivalents to the terms in the document displayed as shown in FIG. 6A (step 604). In this English equivalent applying process, the reference is made to the Japanese-English dictionary 205 in a table form generated in the hard disk drive 104 so that the document to be translated is searched for the terms matching with the terms registered in the fields "JAPANESE STANDARD EXPRESSION" and "JAPANESE ALTERNATIVE SPELLING/EXPRESSION" of the dictionary 205 (step 605). For the Japanese terms in the document having the matching as the result of search, the corresponding English terms in the field "ENGLISH STANDARD EXPRESSION" of the dictionary table 205 are extracted as English equivalents, and the Japanese terms and the English terms as English equivalents are stored in a corresponding manner into the internal memory 105 (step 606) as well as displayed them on the screen.

After the above-mentioned English equivalent applying process is completed (step 607), the supporting program displays a message indicating the completion of English equivalent application and the translator clicks a program "SUPPORT JAPANESE-TO-ENGLISH TRANSLATION" button (step 608).

Thereby, the supporting program divides the display screen of the display unit 102 into, for example, upper and lower portions so that an English equivalent applied Japanese document to be translated is displayed on one of the upper and lower screen portions and the other screen portion is used as an entry area for English sentence. As shown in FIG. 6B, the English equivalent applied Japanese document to be translated is displayed in such a manner that Japanese sentences are successively provided with each at least one sentence (corresponding to, for example, a new paragraph or line made by return or the like) followed by the arrangement of English equivalents for the terms in the at least one sentence having the matching as the result the above-mentioned search, the English equivalents being arranged in the order of occurrence of the matching terms in the at least one sentence (step 609). In this case, the terms in the Japanese document matching with the terms in "JAPANESE STANDARD EXPRESSION'S or "JAPANESE ALTERNATIVE SPELLING/EXPRESSION" may be color-changed and/or underlined in a manner similar to that in the embodiment explained in conjunction with FIGS. 4A to 4E. Also, an English equivalent for a term for which any contents are registered in the field "EXPLANATION" of the terminology dictionary 204/205 is displayed, for example, in bold italic type so that it is distinguished from the other English equivalents (step 610).

While reading the Japanese sentence displayed as shown in FIG. 6B, the translator inputs English translation into the English sentence entry area by typing from the keyboard or like. In translating a term displayed indicating the matching as the result of search of the Japanese sentence, the translator refers to an English equivalent applied to that term to determine whether or not the English equivalent should be used for the translation. In the case where the English equivalent should be used, the translator selects that English equivalent and clicks a displayed "USE" button. Thereby, that English equivalent is copied at a cursor position of the English sentence. On the other hand, in the case where the applied English equivalent is not used, the translator clicks a displayed "NOT USE" button (step 611).

The terms selected as "USE" and "NOT USE" by the translator in the above-mentioned translating process are displayed by different changed colors, respectively. Thereby, in the case where there remain a term with the unchanged display color thereof at the time of completion of translation or in course of translation, the translator can readily find that the translation of the portion where such term is not yet made. Also, that term in the translated sentence inputted in the English sentence entry area, which was taken therein from the applied English equivalent through the "USE" processing, is displayed by a color (for example, pink) different from that (for example, black) of a portion typed in from the keyboard 103 by the translator. A distinction by the application of underline may also be made (step 612).

For an English equivalent represented in bold italic type, the translator positions the cursor at that English equivalent and clicks a "DISPLAY EXPLANATION" button, thereby making it possible to refer to the contents (explanation of term and translation know-how) registered in the field "EXPLANATION" of the terminology dictionary 204 so that the explanation of term and translation know-how may assist the translation. In this manner, the translator continues to translate. As a result, translated sentences, for example, as shown in FIG. 6C are generated in the English sentence entry area.

When the "USE"/"NOT USE" processing is completed for all the terms (step 613), the translator confirms the completion and performs a processing for deleting the coloring and underlines applied to terms in the translated sentences of the English sentence entry area so that the document is displayed, for example, by black as shown in FIG. 6D (step 614) and thereafter performs a processing for printing or preserving the document, as required.

The process and result of the above-mentioned terminological standardization and translation support can be recorded. For example, the number of target equivalents of a target language applied to terms of a source language in a document of the source language matching with terms in standard expression and terms in alternative spelling/expression registered in a terminology dictionary 205, the number of ones of the applied target equivalents of the target language subjected to use in the translation, and the number of ones of the applied target equivalents of the target language subjected to not use in the translation are determined as the record of the process and result and are recorded in the internal memory 105 in order that the record can be displayed or printed (step 616). In the case where such a record is not necessary (step 615), the process is completed without performing step 616. An application program for instructing the computer shown in FIG. 1 to perform the operations of the above-mentioned steps can be stored in a recording medium such as a floppy disk, CD-ROM and/or hard disk drive. Alternatively, the program may be loaded down to the memory of the computer from an external server through a communication network. This also holds for the programs of the operation steps shown in FIG. 4E.

According to the above-mentioned third embodiment for making the support for translation, English equivalents registered in a terminology dictionary can be applied to a Japanese document without omission. Therefore, in translating the Japanese document applied with English equivalents, a translator has no longer a need to refer to the terminology dictionary. Also, the translator can make translation by use of all the applied English equivalents, so long as the applied English equivalent is not consciously determined as being not used.

Also, even in the case where terms in alternative spelling/expression are included in the Japanese document, English equivalents in standard expression are applied corresponding to the terms in alternative spelling/expression, so long as the terms in alternative spelling/expression are registered in the terminology dictionary 204/205. Therefore, the translator can use correct English equivalents with no consciousness of the distinction of the terms in the Japanese document between standard expression and alternative spelling/expression, thereby making it possible to improve the accuracy of translation. As a result, it becomes possible to automatically attain the standardization of English equivalents in a translated document without relying upon the translator's knowledge or sense.

Further, it is possible to leave the evidence of the process and result of terminological standardization and translation. Furthermore, in the case where a checker checks the document, the checking can be performed concentrating attention upon the matters other than the terms. Therefore, it is possible to improve the efficiency of checking.

Next, other methods for the application of English equivalents in the translation support mentioned in conjunction with FIGS. 6A to 6E will be explained referring to FIGS. 7A to 7D. Such application of English equivalents can take various modes without being limited to the example explained in conjunction with FIG. 6B.

In the example explained in conjunction with FIGS. 6A to 6E, the application of English equivalents is displayed, as shown in FIG. 6B, in such a manner that Japanese sentences are successively provided with each at least one sentence immediately followed by the arrangement of English equivalents for Japanese terms in the at least one sentence in the order of occurrence of the Japanese terms in the at least one sentence.

FIGS. 7A to 7D show several examples in which a Japanese document applied with English equivalents is displayed, on the side of a divisional area of the display screen other than the divisional English sentence entry area, in the translation support explained in conjunction with FIGS. 6A to 6E, or more particularly, at the time of application of English equivalents to a Japanese document displayed as shown in FIG. 6A and after the selection of "SUPPORT JAPANESE-TO-ENGLISH TRANSLATION" button in the processing menu.

FIG. 7A is an example in which only a Japanese document is immediately displayed in such a manner that Japanese terms matching with Japanese terms registered in the Japanese-English dictionary 205 are underlined. A translator performs a translation work while reading the Japanese document displayed as shown in FIG. 7A. In the case where the translator desires to obtain an English equivalent for those Japanese term matching with the Japanese term registered in the Japanese-English dictionary 205, the translator positions a cursor at the matching term in the Japanese document and clicks a "USE" button. Thereby, an English equivalent in standard expression for the Japanese term is given at the cursor position of the English sentence entry area.

FIG. 7B is an example of a modified version of the example shown in FIG. 6B. In the case where the document shown in FIG. 6B is displayed monochromatically (such as only single color of pink) (for distinction between a large number of matched terms as in the example explained in conjunction with FIG. 4B), the discrimination of the correspondence between a Japanese term and an English equivalent applied may be difficult on the display screen. This inconvenience is prevented by the present example shown in FIG. 7B. Namely, in the present example, the matching Japanese terms are displayed in a coloring manner with different kinds of colors (for example, blue, red and green) appearing cyclically in the order of occurrence of the terms and the corresponding English equivalents are also displayed with the same cyclic coloring. In FIG. 7B, this cyclic coloring is shown by an alternative version thereof using different kinds of underlines (solid line, dotted line and wave line) as well as the different kinds of colors. Thereby, it is possible for a translator to easily recognize the correspondence of Japanese terms to English equivalents on display screen.

FIG. 7C is an example in which a matching Japanese term is replaced by its English equivalent. In the present example, only the translation of the remaining portions represented in Japanese suffices for a translator.

FIG. 7D is an example in which a matching Japanese term is immediately followed by its English equivalent. Thereby, a translator can know the correspondence of Japanese terms to English equivalents easily, whereby it may improve the efficiency of translation work.

In the above-mentioned Japanese-to-English translation support, both a Japanese term and an English term in the terminology dictionary may be registered together with part-of-speech information with different words being registered for respective parts of speech. In this case, it is possible to apply an English equivalent corresponding to the part of speech of the Japanese word. For example, a Japanese term " 格納 (kakunō)" is registered in the terminology dictionary together with Japanese parts of speech including noun and Japanese sahen verb [or inflective verb (- - - する (suru))" having sahen conjection] and an English equivalent is inputted including "storage; noun" and "store; verb". When the Japanese text includes such a nounal wording as " 格納と削除 (kakuno to sakujo)", it is possible to apply "storage" as an English equivalent. When the use as a verb is made as "- - - を格納して (o kakunoshite) - - - ", it is possible to apply "store" as an English equivalent.

Though the above-mentioned support for translation inclusive of terminological standardization has been explained in conjunction with the example of Japanese-to-English translation, it is needless to say that the present invention is applicable to translation between any other different languages inclusive English-to-Japanese translation, so long as any language can be mentioned by characters or fonts on the display screen of a computer.

The difference between a Japanese-English dictionary with standard expression as well as alternative spelling/expression according to the present invention (hereinafter referred to as alternative spelling/expression dictionary) and a general Japanese-English dictionary will now be explained referring to FIG. 8.

FIG. 8, shows that two term examples 802 and 803 are registered in a alternative spelling/expression dictionary 801 according to the present invention and two examples 811 and 812 corresponding to the above term examples are registered in a general dictionary 810. Now assume the case where the reference to the dictionary is made to search for English equivalents for a term 821 " 相手の CPU (aite no shīpiyu)" and a term 821 " フロッピー (furoppī)" in an example 820 " 相手の CPU のからフロッピーの内容を- - - " (a sentence to be translated or checked) inputted to the supporting system. The dictionary 810 has only " フロッピーディスク CPU" 811 and " フロッピーディスク" 812 in standard expression. Therefore, the search of the dictionary 810 results in that no hit to (or no matching with) the terms 821 and 822 is obtained. On the other hand, the alternative spelling/expression dictionary 801 is registered with terms in standard expression as well as terms 804 to 808 in alternative spelling/expression including synonyms. Therefore, the search of the dictionary 801 results in that hits to the terms 821 and 822 are obtained and an English equivalent 832 "remote CPC" in standard expression and 833 "floppy disk" are applied, respectively and, Japanese-English translation, or Japanese terminology standardization can be realized by finding Japanese alternative spelling/expressions (821 and 822) and giving Japanese standard expressions 802 and 803, respectively. It will be understood that alternative spelling/expressions exist for the English equivalents (namely, alternative spelling/expression 834 "CPU at remote location" for the English equivalent 832 and alternative spelling/expressions 835 "floppy diskette", 836 "diskette", 837 "archive disk", 838 "archive diskette" and 839 "FD" for the English equivalent 833) and those alternative spelling/expressions can be used at the time of need for standardization or change of terms in an English document. It is preferable that unlike a general dictionary, a alternative spelling/expression dictionary used in the present invention is generated for every field to which a document to be composed or a document to be translated belongs or as a separate file for each field and is stored in a recording medium such as a floppy disk or CD-ROM. Also, in the case where such a dictionary data base is loaded to the hard disk drive 104 of the supporting system (or computer) according to the present system, it may be loaded down to the hard disk drive 104 through a communication network from an external server in lieu of the recording medium.

In the document composition or translation supporting system according to the present invention, a supporting program may be loaded to the internal memory 105 from the exterior in a manner similar to that for the alternative spelling/expression data base dictionary loaded to the system.

A software tool for realizing the present invention is available as "HT³-J" (product name; Hitachi Terminology Transformation Tool-Japanese) offered for sale by the assignee of the present application and this software is a tool for the standardization of terms in Japanese text, the application of target equivalents for support for Japanese-to-English translation, and the generation of the dictionary. A software tool "HT³-E" offered for sale by the same assignee includes a tool for the standardization of terms in English text, the application of target equivalents for support for English-to-Japanese translation, and the generation of the dictionary. The contents of catalog of software HT³ for standardization of terms and target equivalents are incorporated by reference in the present disclosure. In connection with the development of the above-mentioned supporting system, one can refer to Japanese article titled "Development of HT program for technical term transformation and standardization", Technical Communication Association, August 1996. For understanding of the concept of the present invention, the contents of that Japanese article are incorporated by reference in the present disclosure.

In document composition according to the present invention as explained in the foregoing, terms in alternative spelling/expression can be replaced by terms in standard expression without omission. Also, the checking can be made as to how many terms in a terminology dictionary have been used.

In translation of a document from a source language to a target language according to the present invention, target equivalents of the target language registered in a terminology dictionary can be applied to the document of the source language without omission. In making the translation by use of the document applied with target equivalents, a translator has no longer a need to refer to the terminology dictionary of book like or electronic. Also, the translator can apply correct target equivalents of the target language even to terms of the source language in alternative spelling/expression with no consciousness of the distinction between standard expression and alternative spelling/expression, thereby making it possible to improve the accuracy of translation.

According to the present invention, it is possible to leave the evidence of the process and result of document composition or translation.

We claim:

1. A document composition supporting method for supporting editing of any given document by use of an electronic terminology dictionary while displaying said given document on a display unit, comprising:

generating said electronic terminology dictionary so that at least terms in standard expression and terms in alternative spelling/expression corresponding thereto are registered in association with each other, at least one term in alternative spelling/expression being registered corresponding to each of said terms in standard expression;

inputting said given document and searching the input document by use of said electronic terminology dictionary for terms in said document which match with the terms in standard expression and the terms in alternative spelling/expression registered in said electronic terminology dictionary;

editing said document on the basis of the result of search so that the terms in said document matching with the terms in alternative spelling/expression registered in said electronic terminology dictionary are replaced by the corresponding terms in standard expression registered in said electronic terminology dictionary; and displaying in response to the results of the search of said document, terms in said document matching with the terms in standard expression registered in said electronic terminology and terms in said document matching with the terms in the alternative spelling/expression registered in said electronic terminology dictionary on said display unit by use of different kinds of colors and/or underlines, respectively, so that they are distinguished from each other and from the other portions of said document.

2. A document composition supporting method according to claim 1, wherein the terms in said document matching with the terms in alternative spelling/expression registered in said electronic terminology dictionary are successively or concurrently replaced by the corresponding terms in the standard expression in accordance with a checker's determination.

3. A document composition supporting method according to claim 1, wherein after the replacement, the number of terms in said inputted document matching with the terms in standard expression, the number of terms in said inputted document matching with the terms in alternative spelling/expression, and the number of terms in said inputted document matching with the terms in alternative spelling/expression replaced by the corresponding terms in standard expression are determined as the record of search and editing.

4. A document composition supporting method according to claim 1, wherein said electronic terminology dictionary has an explanation field including at least the explanation of term registered corresponding to each of specified ones of the terms in standard expression, and wherein in the case where the specified term is included in said inputted document, the specified term is displayed in a form distinguishable from other terms, whereby the reference can be made to the contents of the corresponding explanation of term registered in the explanation field of said electronic terminology dictionary.

5. A document composition supporting method according to claim 1, wherein said electronic terminology dictionary includes a character string for sorting corresponding to each of the terms in standard expression, and the method further comprises a step of generating, in response to inputting of the reading of that term by Japanese kana characters, a Japanese character string for sorting by deleting dakuon and handakuon marks from the inputted kana characters and converting small size kana characters representative of sokuon and yoon into normal size kana characters, and generating, in response to the input of the reading of that term by alphanumeric characters, alphanumeric character strings for sorting by converting converting capital letters into lower letters and deleting symbols inclusive of space.

6. A document composition supporting method for supporting the translation of any given document of a source language from said source language to a target language by use of an electronic terminology dictionary while displaying said given document on a display unit, comprising:

generating said electronic terminology dictionary so that at least terms of said source language in standard expression, terms of said source language in alternative spelling/expression corresponding to the terms of said source language in standard expression, and target equivalents of said target language in standard expression corresponding to the terms of said source language in standard expression are registered in association with to each other, at least one term of said source language in alternative spelling/expression being registered corresponding to each of said terms of said source language in standard expression;

inputting said given document and searching the inputted document by use of said electronic terminology dictionary for terms in said document matching with the terms of said source language in standard expression and the terms of said source language in alternative spelling/expression registered in said electronic terminology dictionary to allow the application of target equivalents of said target language in standard expression corresponding to the matching terms in said document; and in response to the results of search of said document, successively displaying sentences in said document on said display unit with each at least one sentence being followed by the arrangement of target equivalents of said target language in standard expression corresponding to the matching terms in said at least one sentence so that the terms in said at least one sentence matching with the terms of said source language in standard expression and the terms of said source language in alternative spelling/expression registered in said electronic terminology dictionary are displayed by use of at least one kind of color and/or underline in a manner distinguished from the other portions of said at least one sentence and the target equivalents of said target language in standard expression corresponding to the matching terms in said at least one sentence are displayed in the order of occurrence of the matching terms in said at least one sentence.

7. A document composition supporting method according to claim 6, wherein on the basis of the result of search of said document, said document is displayed on said display unit so that each of the terms in said document matching with the terms of said source language in standard expression and the terms of said source language in alternative spelling/expression registered in said electronic terminology dictionary is immediately followed by the target equivalent of said target language in standard expression corresponding to that matching term in said document.

8. A document composition supporting method according to claim 6, wherein on the basis of the result of search of said document, said document is displayed on said display unit so that each of the terms in said document matching with the terms of said source language in standard expression and the terms of said source language in alternative spelling/expression registered in said electronic terminology dictionary is replaced by the target equivalent of said target language in standard expression corresponding to that matching term in said document.

9. A document composition supporting method according to claim 6, wherein on the basis of the result of search of said document, said document is displayed on said display unit so that each of the terms in said document matching with the terms of said source language in standard expression and the terms of said source language in alternative spelling/expression registered in said electronic terminology dictionary is color changed and/or underlined to allow a translator to refer to said terminology dictionary for the application of the target equivalent of said target language in standard expression corresponding to that matching term in said document.

10. A document composition supporting method according to claim 6, wherein the number of target equivalents of said target language in standard expression applied to terms in said inputted document matching with the terms of said source language in standard expression and the terms of said source language in alternative spelling/expression registered in said electronic terminology dictionary, the number of ones of the applied target equivalents of said target language subjected to use as translated terms, and the number of ones of the applied target equivalents of said target language subjected to no use as translated terms are determined as the record of translation.

11. A document composition supporting method according to claim 6, wherein said electronic terminology dictionary has an explanation field including at least the translation know-how inputted corresponding to each of specified ones of the target equivalents of said target language in standard expression, and wherein in the case where the specified target equivalent is applied, the specified target equivalent is displayed in a form distinguishable from other target equivalents, whereby the reference can be made to the contents of the corresponding translation know-how registered in the explanation field of said electronic terminology dictionary.

12. An electronic terminology dictionary used for the support of editing and translation of a document, in which terms of a source language in standard expression, terms of said source language in alternative spelling/expression corresponding to the terms of said source language in standard expression, target equivalents of a target language in standard expression, and target equivalents of said target language in alternative spelling/expression corresponding to the target equivalents of said target language in standard expression are data-based, at least one term of said source language in alternative spelling/ expression being provided corresponding to each of said terms of said source language in standard expression, and at least one target equivalent of said target language in alternative spelling/expression being provided corresponding to each of said target equivalents of said target language in standard expression.

13. A document composition supporting system for supporting editing of any given document while displaying said given document on the display screen of a display unit, comprising:

a processor;

a memory for storing an electronic terminology dictionary generated such that at least terms in standard expression and terms in alternative spelling/expression corresponding thereto are registered in association with each other, at least one term in alternative spelling/expression being registered corresponding to each of said terms in standard expression;

inputting and storing means for inputting and storing said given document;

searching means for searching the inputted document by use of said electronic terminology dictionary for terms in said document matching with the terms in standard expression and the terms in alternative spelling/expression registered in said electronic terminology dictionary and for displaying the result of search on the display screen of said display unit, said searching means being constructed by said processor coupled to said dictionary storing memory and said document inputting/storing means; and means for editing said document displayed on the display screen of said display unit such that the terms in said document matching with the terms in alternative spelling/expression registered in said electronic terminology dictionary are replaced by the corresponding terms in standard expression;

wherein said searching means displays the result of search on the display screen of said display unit so that terms in said document matching with the terms in standard expression registered in said electronic terminology dictionary and terms in said document matching with the terms in alternative spelling/expression registered in said electronic terminology dictionary are displayed by use of different kinds of colors and/or underlines, respectively so that they are distinguished from each other and from the other portions of said document.

14. A document composition supporting system according to claim 13, wherein the terms in said document matching with the terms in alternative spelling/expression registered in said electronic terminology dictionary are successively or en bloc replaced by the corresponding terms in standard expression in accordance with an editor's determination.

15. A document composition supporting system according to claim 13, further comprising means for determining, after the replacement, the number of terms in said inputted document matching with the terms in standard expression, the number of terms in said inputted document matching with the terms in alternative spelling/expression, and the number of terms in said inputted document matching with the terms in alternative spelling/expression and storing them as the record of search and editing.

16. A document composition supporting system according to claim 13, wherein said electronic terminology dictionary has an explanation field including at least the explanation of the term registered corresponding to each of specified ones of the terms in standard expression, and the system further comprises means for displaying, in the case where the specified term is included in said inputted document, the specified term on the display screen of said display unit so that it is distinguishable from other terms, and means for designating said specified term displayed on the display screen of said display unit to allow the display of the contents of the explanation of term corresponding to the designated term registered in the explanation field of said electronic terminology dictionary.

17. A document composition supporting system according to claim 13, wherein said electronic terminology dictionary includes a character string for sorting corresponding to each of the terms in standard expression, and the system further comprises means for generating, in response to the input of the reading of that the term by Japanese kana characters, a Japanese character string for sorting by deleting dakuon and handakuon marks from the inputted kana characters and converting small size kana characters representative of sokuon and yoon into normal size kana characters and for generating, in response to the input of the reading of that term by alphanumeric characters, alphanumeric character strings for sorting by converting capital letters into lower letters and deleting symbols inclusive of space.

18. A document composition supporting system for supporting the translation of any given document of a source language from said source language to a target language while displaying said given document on the display screen of a display unit, comprising:

means for storing an electronic terminology dictionary generated such that at least terms of said source language in standard expression, terms of said source language in alternative spelling/expression corresponding to the terms of said source language in standard expression, and target equivalents of said target language in standard expression corresponding to the terms of said source language in standard expression are registered in association with to each other, at least one term of said source language in alternative spelling/expression being registered corresponding to each of said terms of said source language in standard expression;

means for inputting said given document and searching the inputted document by use of said electronic terminology dictionary for terms in said document matching with the terms of said source language in standard expression and the terms of said source language in alternative spelling/expression registered in said electronic terminology dictionary to allow the application of target equivalents of said target language in standard expression corresponding to the matching terms in document; and means for displaying, on the basis of the result of search of said document, sentences in said document successively on the display screen of said display unit with each at least one sentence being followed by the arrangement of target equivalents of said target language in standard expression corresponding to the matching terms in said at least one sentence so that the terms in said at least one sentence matching with the terms of said source language in standard expression and the terms of said source language in alternative spelling/expression registered in said electronic terminology dictionary are displayed by use of at least one kind of color and/or underline in a manner distinguished from the other portions of said at least one sentence and the target equivalents of said target language in standard expression corresponding to the matching terms in said at least one sentence are displayed in the order of occurrence of the matching terms in said at least one sentence.

19. A document composition supporting system according to claim 18, further comprising means for displaying, on the basis of the result of search of said document, said document on said display unit so that each of the terms in said document matching with the terms of said source language in standard expression and the terms of said source language in alternative spelling/expression registered in said electronic terminology dictionary is immediately followed by the target equivalent of said target language in standard expression corresponding to that matching term in said document.

20. A document composition supporting system according to claim 18, further comprising means for displaying, on the basis of the result of search of said document, said document on the display screen of said display unit so that each of the terms in said document matching with the terms of said source language in standard expression and the terms of said source language in alternative spelling/expression registered in said electronic terminology dictionary is replaced by the target equivalent of said target language in standard expression corresponding to that matching term in said document.

21. A document composition supporting system according to claim 18, further comprising means for displaying, on the basis of the result of search of said document, said document on the display screen of said display unit so that each of the terms in said document matching with the terms of said source language in standard expression and the terms of said source language in alternative spelling/expression registered in said electronic terminology dictionary is color changed and/or underlined to allow a translator to refer to said electronic terminology dictionary for the application of the target equivalent of said target language in standard expression corresponding to that matching term in said document.

22. A document composition supporting system according to claim 18, further comprising means for determining the number of target equivalents of said target language in standard expression applied to terms in said inputted document matching with the terms of said source language in standard expression and the terms of said source language in alternative spelling/expression registered in said electronic terminology dictionary, the number of ones of the applied target equivalents of said target language subjected to use as translated terms, and the number of ones of the applied target equivalents of said target language subjected to no use as translated terms, and displaying and storing them as the record of translation.

23. A document composition supporting system according to claim 18, wherein said electronic terminology dictionary has an explanation field including at least know-how about a translation registered corresponding to each of specified ones of the target equivalents of said target language in standard expression, and the system further comprises means for displaying, in the case where the specified target equivalent is applied, the specified target equivalent on the display screen of said display unit so that it is distinguishable from other target equivalents, and means for designating said specified term displayed on the display screen of said display unit to allow the display of the contents of the explanation of term corresponding to the designated term registered in the explanation field of said electronic terminology dictionary.

24. A computer readable recording medium storing program code means for performing the processing of a document composition supporting system to support editing of any given document by use of a computer, said program code means comprising:

means for using an electronic terminology dictionary in which at least terms in standard expression and terms in alternative spelling/expression corresponding thereto are registered in association with each other, at least one term in alternative spelling/expression being registered corresponding to each of said terms in standard expression;

means for inputting said given document and searching the inputted document of terms in said document which match with the terms in standard expression and the terms in alternative spelling/expression inputted in said electronic terminology dictionary wherein said searching means displays the result of search on the display screen of a display unit so that terms in said document matching with the terms in standard expression registered in said electronic terminology dictionary and terms in said document matching with the terms in alternative spelling/expression registered in said electronic terminology dictionary are displayed by use of different kinds of colors and/or underlines, respectively, so that they are distinguished from each other and from the other portions of said document; and means for revising said document on the basis of the result of search such that the terms in said document matching with the terms in alternative spelling/expression registered in said electronic terminology dictionary are replaced by the corresponding terms in standard expression registered in said electronic terminology.

25. A document composition supporting system for supporting the editing of any given document by use of a computer, said system including means with which a program for performing the operation of the system is loaded from an external server into a memory of the computer, said program comprising:

program means for using an electronic terminology dictionary in which at least terms in standard expression and terms in alternative spelling/expression corresponding thereto are registered in association with each other, at least one term in alternative spelling/expression being registered corresponding to each of said terms in standard expression;

program means for inputting said given document and searching the inputted document for terms in said document which match with the terms in standard expression and the terms in alternative spelling/expression registered in said electronic terminology dictionary wherein said searching means displays the result of search on the display screen of a display unit so that terms in said document matching with the terms in standard expression registered in said electronic terminology dictionary and terms in said document matching with the terms in alternative spelling/expression registered in said electronic terminology dictionary are displayed by use of different kinds of colors and/or underlines, respectively, so that they are distinguished from each other and from the other portions of said document; and program means for revising said document on the basis of the result of search so that the terms in said document matching with the terms in alternative spelling/expression registered in said electronic terminology dictionary are replaced by the corresponding terms in standard expression registered in said electronic terminology.

26. A computer readable recording medium storing program code means for performing the processing of a document composition supporting system to support the translation of any given document of a source language from said source language to a target language by use of a computer, said program code means comprising:

program means for using an electronic terminology dictionary in which at least terms of said source language in standard expression, terms of said source language in alternative spelling/expression corresponding to the terms of said source language in standard expression, and target equivalents of said target language in standard expression corresponding to the terms of said source language in standard expression are registered in association with each other, at least one term of said source language in alternative spelling/expression being registered corresponding to each of said terms of said source language in standard expression; and program means for inputting said given document and searching the inputted document for terms in said document matching with the terms of said source language in standard expression and the terms of said source language in alternative spelling/expression registered in said electronic terminology dictionary to allow on the basis of the result of search the application of target equivalents of said target language in standard expression corresponding to the matching terms in said document wherein said searching means displays the result of search on the display screen of a display unit so that terms in said document matching with the terms in standard expression registered in said electronic terminology dictionary and terms in said document matching with the terms in alternative spelling/expression registered in said electronic terminology dictionary are displayed by use of different kinds of colors and/or underlines, respectively, so that they are distinguished from each other and from the other portions of said document.

27. A document composition supporting system for supporting the translation of any given document of a source language from said source language to a target language by use of a computer, said system including means with which a program for performing the operation of the system is loaded from an external server into a memory of the computer, said program comprising:

program means for using an electronic terminology dictionary in which at least terms of said source language in standard expression, terms of said source language in alternative spelling/expression corresponding to the terms of said source language in standard expression, and target equivalents of said target language in standard expression corresponding to the terms of said source language in standard expression are registered in association with each other, at least one term of said source language in alternative spelling/expression being registered corresponding to each of said terms of said source language in standard expression; and program means for inputting said given document and searching the inputted document for terms in said document matching with the terms of said source language in standard expression and the terms of said source language in alternative spelling/expression registered in said electronic terminology dictionary to allow on the basis of the result of search the application of target equivalents of said target language in standard expression corresponding to the matching terms in said document wherein said searching means displays the result of search on the display screen of a display unit so that terms in said document matching with the terms in standard expression registered in said electronic terminology dictionary and terms in said document matching with the terms in alternative spelling/expression registered in said electronic terminology dictionary are displayed by use of different kinds of colors and/or underlines, respectively, so that they are distinguished from each other and from the other portions of said document.

* * * * *

UNITED STATES PATENT AND TRADEMARK OFFICE
CERTIFICATE OF CORRECTION

PATENT NO. : 6,047,299     Page 1 of 3
DATED      : April 4, 2000
INVENTOR(S): Ryota Kaijima It is certified that error appears in the above-identified patent and that said Letters Patent is hereby corrected as shown below:

| Column | Line | |
|---|---|---|
| 1 | 20 | Change "includes" to --include--. |
| 2 | 16 | Change "is a" to --are--. |
| 3 | 12 | Change "relied upon" to --relying on--. |
| 5 | 53 | After "with" delete "to". |
| 6 | 54 | Change "has" to --have--. |
| 7 | 51 | Change "an" to --a--. |
| 9 | 10-11 | After "For example," delete entire line, delete line 11, and insert therefor: -- "ストア (sutoa)", "ストアー (sutoā)", "保存 (hozon)" and "セーブ (sēbu)" may be used as terms--. |

UNITED STATES PATENT AND TRADEMARK OFFICE
CERTIFICATE OF CORRECTION

PATENT NO. : 6,047,299
DATED : April 4, 2000
INVENTOR(S) : Ryota Kaijima

It is certified that error appears in the above-identified patent and that said Letters Patent is hereby corrected as shown below:

| Column | Line | |
|---|---|---|
| 9 | 54 | After "loaded as" delete second quotation mark. |
| 9 | 55 | Delete second quotation mark shown as " . ". |
| 9 | 56 | Delete second quotation mark shown as " . ". |
| 11 | 14 | After "with" delete "to". |
| 12 | 34 | After "English)" delete second set of quotation marks. |
| 12 | 37 | After "terms" delete second set of quotation marks. |
| 12 | 38 | After "("arrive" in English)," delete second set of quotation marks. |
| 14 | 51 | Delete "them". |
| 15 | 34 | Change "remain" to --remains--. |
| 17 | 16 | Change "term" to --terms-- (two occurrences). |

UNITED STATES PATENT AND TRADEMARK OFFICE
CERTIFICATE OF CORRECTION

PATENT NO. : 6,047,299
DATED : April 4, 2000
INVENTOR(S) : Ryota Kaijima

It is certified that error appears in the above-identified patent and that said Letters Patent is hereby corrected as shown below:

| Column | Line | |
|---|---|---|
| 17 | 60 | After "term" delete second quotation marks. |
| 17 | 66 | After "as" delete second quotation marks. |
| 18 | 10 | Change "mentioned" to --expressed--. |
| 18 | 29 | Before "CPU" 811" delete all characters and replace with -- "相手 --. |
| 18 | 51 | Change "a" to --an--. |
| 20 | 53 | Delete "converting" (second occurrence). |
| 23 | 67 | After "with" delete "to". |
| 25 | 40 | Change "of" to --for--. |

Signed and Sealed this

Eighth Day of May, 2001

NICHOLAS P. GODICI

Attest:

Attesting Officer

Acting Director of the United States Patent and Trademark Office